US011257341B2

(12) United States Patent
Rao et al.

(10) Patent No.: US 11,257,341 B2
(45) Date of Patent: Feb. 22, 2022

(54) SYSTEM AND METHOD FOR MONITORING AND SUPPRESSING FIRE

(71) Applicant: Tyco Fire & Security GmbH, Neuhausen am Rheinfall (CH)

(72) Inventors: Manjuprakash Rama Rao, Bangalore (IN); Surajit Borah, Bangalore (IN); Sreenath K. Ramanna, Bangalore (IN); P. U. Kamruddin, Bangalore (IN); Andrew Rynkiewicz, Bracknell (GB); Clive Weston, Frimley (GB)

(73) Assignee: Tyco Fire Products, Lansdale, PA (US)

( * ) Notice: Subject to any disclaimer, the term of this patent is extended or adjusted under 35 U.S.C. 154(b) by 356 days.

(21) Appl. No.: 15/105,308

(22) PCT Filed: Dec. 17, 2014

(86) PCT No.: PCT/IB2014/066988
§ 371 (c)(1),
(2) Date: Jun. 16, 2016

(87) PCT Pub. No.: WO2015/092692
PCT Pub. Date: Jun. 25, 2015

(65) Prior Publication Data
US 2016/0321900 A1 Nov. 3, 2016

Related U.S. Application Data

(60) Provisional application No. 61/916,917, filed on Dec. 17, 2013.

(51) Int. Cl.
*G08B 17/12* (2006.01)
*B05B 12/08* (2006.01)
(Continued)

(52) U.S. Cl.
CPC ............ *G08B 17/125* (2013.01); *A62C 37/36* (2013.01); *B05B 12/082* (2013.01); *B05B 12/12* (2013.01);
(Continued)

(58) Field of Classification Search
CPC .... G08B 17/125; G08B 29/185; A62C 37/36; B05B 12/082; B05B 12/12; G01J 5/0018; G01P 5/00; G01P 13/0006
(Continued)

(56) References Cited

U.S. PATENT DOCUMENTS 4,149,159 A    4/1979  Datwyler et al.
4,195,286 A    3/1980  Galvin
(Continued)

FOREIGN PATENT DOCUMENTS

EP    1103285 A1    5/2001
EP    1122700 A1    8/2001
(Continued)

OTHER PUBLICATIONS

Kaiser, T., "Fire Detection with Temperature Sensor Arrays," Security Technology, 2000. Proceedings, IEEE 34th Annual International Conference, Oct. 23, 2000, pp. 262-268.
(Continued)

*Primary Examiner* — Tuongminh N Pham
(74) *Attorney, Agent, or Firm* — HoustonHogle LLP

(57) ABSTRACT

A fire detection and suppression system includes a system controller for determining an initial location of the fire based on fire location information from fire detectors, and then the system controller determines a final location of the fire based on fire location information taking into account spatial and/or angular relationships between the fire detectors and the initial location. The system controller determines a location of the fire and activates monitors to deploy sup-
(Continued)

pressant based on a distance between each of the monitors and the location of the fire. The system controller controls the monitors based on how the suppressant is deployed onto the fire.

14 Claims, 22 Drawing Sheets

(51) Int. Cl.
| | |
|---|---|
| B05B 12/12 | (2006.01) |
| A62C 37/36 | (2006.01) |
| G08B 29/18 | (2006.01) |
| G01J 5/00 | (2022.01) |
| G01P 5/00 | (2006.01) |
| G01P 13/00 | (2006.01) |

(52) U.S. Cl.
CPC .............. *G01J 5/0018* (2013.01); *G01P 5/00* (2013.01); *G01P 13/0006* (2013.01); *G08B 29/185* (2013.01)

(58) Field of Classification Search
USPC .................................. 169/46, 47, 56, 60, 61
See application file for complete search history.

(56) References Cited

U.S. PATENT DOCUMENTS

| | | | |
|---|---|---|---|
| 4,749,862 A | 6/1988 | Yoshida et al. | |
| 4,821,805 A * | 4/1989 | Saito | A62C 37/00 169/5 |
| 4,909,329 A * | 3/1990 | Yoshida | A62C 37/00 169/25 |
| 5,107,128 A | 4/1992 | Davall et al. | |
| 5,165,482 A | 11/1992 | Smagac et al. | |
| 5,937,077 A * | 8/1999 | Chan | G08B 17/125 250/339.15 |
| 6,267,539 B1 * | 7/2001 | Mihalcin | E21F 17/00 406/137 |
| 6,819,237 B2 * | 11/2004 | Wilson | G08B 17/00 169/46 |
| 8,180,583 B1 | 5/2012 | Gossweiler et al. | |
| 8,714,466 B2 * | 5/2014 | Trapp | A62C 31/005 169/24 |
| 9,449,240 B2 | 9/2016 | Lorenzoni | |
| 10,255,506 B2 | 4/2019 | Lorenzoni | |
| 2002/0026431 A1 | 2/2002 | Pedersen et al. | |
| 2004/0089735 A1 | 5/2004 | Drechsel | |
| 2004/0129434 A1 * | 7/2004 | Tan | A62C 37/40 169/37 |
| 2004/0163827 A1 * | 8/2004 | Privalov | A62C 3/0271 169/46 |
| 2004/0249590 A1 | 12/2004 | Ota et al. | |
| 2004/0254652 A1 | 12/2004 | Ota et al. | |
| 2008/0248450 A1 | 10/2008 | Li et al. | |
| 2009/0101368 A1 * | 4/2009 | Lozier | A62C 31/28 169/56 |
| 2010/0042263 A1 | 2/2010 | Jacobsen et al. | |
| 2010/0070097 A1 | 3/2010 | Morgenstern et al. | |
| 2010/0117839 A1 | 5/2010 | Lee | |
| 2011/0155397 A1 | 6/2011 | Icove et al. | |
| 2011/0295569 A1 | 12/2011 | Hamke et al. | |
| 2012/0001760 A1 | 1/2012 | Harchanko | |
| 2012/0314066 A1 | 12/2012 | Lee et al. | |
| 2013/0090772 A1 | 4/2013 | Pfrenger | |
| 2013/0106312 A1 | 5/2013 | Beardsley et al. | |
| 2014/0028803 A1 | 1/2014 | Hanses et al. | |
| 2014/0300888 A1 | 10/2014 | Duffey et al. | |
| 2014/0334674 A1 | 11/2014 | Lorenzoni | |
| 2015/0021054 A1 | 1/2015 | McNamara et al. | |
| 2016/0328937 A1 | 11/2016 | Rao et al. | |
| 2016/0328938 A1 | 11/2016 | Rao et al. | |
| 2017/0095682 A1 | 4/2017 | Combs | |
| 2017/0153327 A1 | 6/2017 | Nishioka et al. | |
| 2017/0328345 A1 | 11/2017 | Grober | |
| 2018/0292661 A1 | 10/2018 | Songa et al. | |

FOREIGN PATENT DOCUMENTS

| | | | | |
|---|---|---|---|---|
| EP | 2264677 A1 | 12/2010 | | |
| GB | 2 468 398 A | 9/2010 | | |
| JP | H05266373 A | 10/1993 | | |
| NO | 02081031 A2 | 10/2002 | | |
| WO | WO-9406517 A1 * | 3/1994 | ............ | A62C 31/02 |

OTHER PUBLICATIONS

Munoz, M. et al., "Analysis of the geometric and radiative characteristics of hydrocarbon pool fires," Combustion and Flame, vol. 139, No. 3, Nov. 14, 2004, pp. 263-277.
Ukil, A., et al., "Distributed Temperature Sensing: Review of Technology and Applications," IEEE Sensors Journal, vol. 12, No. 5, May 2012, pp. 885-892.
Xia, D., et al., "A Method Research on Fire Source Localization Using Dual-Line Gas Sensor Array," Intelligent Control and Automation, 2008. Proceedings of the 7th World Congress on Intelligent Control and Automation, Jun. 25-27, 2008, pp. 5862-5865.
International Search Report and Written Opinion of the International Searching Authority, dated Mar. 5, 2015, from International Application No. PCT/IB2014/066987, filed Dec. 17, 2014. Eleven pages.
International Search Report and Written Opinion of the International Searching Authority, dated Mar. 3, 2015, from International Application No. PCT/IB2014/066988, filed Dec. 17, 2014. Sixteen pages.
International Search Report and Written Opinion of the International Searching Authority, dated Mar. 12, 2015, from International Application No. PCT/IB2014/066989, filed Dec. 17, 2014. Twenty-two pages.
Glockling, J. et al., "Development of a robotic local suppression system for the marine environment," Proceedings of the National Fire Protection Association Suppression and Detection Research and Applications Conference, Mar. 2008. Thirteen pages.
Glockling, J. et al., "Shipboard Intelligent Fire Suppression Systems," Proceedings of the National Fire Protection Association Suppression and Detection Research and Applications Conference, Mar. 2007. Thirteen pages.
Infra-Red Flame Detection, Flame Vision FV 300 User Manual, UM 35, Issue 3, 120-415-886,Tyco Safety Products, copyright 2008 Thorn Security Ltd. Sixty-eight pages.
International Preliminary Report on Patentability, dated Jun. 30, 2016, from International Application No. PCT/IB2014/066987, filed on Dec. 17, 2014. Nine pages.
International Preliminary Report on Patentability, dated Jun. 30, 2016, from International Application No. PCT/B2014/066988, filed on Dec. 17, 2014. Fourteen pages.
International Preliminary Report on Patentability, dated Jun. 30, 2016, from International Application No. PCT/IB2014/066989, filed on Dec. 17, 2014. Twenty pages.
First Examination Report, dated Jul. 16, 2019, for European Patent Application No. 14 825 187.9. 7 pages.

* cited by examiner

322

SYSTEM AND METHOD FOR MONITORING AND SUPPRESSING FIRE

RELATED APPLICATIONS

This application is a § 371 National Phase Application of International Application No. PCT/IB2014/066988, filed on Dec. 17, 2014, which claims the benefit under 35 USC 119(e) of U.S. Provisional Application No. 61/916,917, filed on Dec. 17, 2013 both of which are incorporated herein by reference in their entirety.

This application is related to U.S. application Ser. No. 15/105,304 filed on Jun. 16, 2016, and having the same inventors, entitled "System and Method for Detecting Fire Location", now U.S. Patent Publication No. US 2016-0328937 A1, and U.S. application Ser. No. 15/105,311 filed on Jun. 16, 2016, and having the same inventors, entitled "System and Method for Detecting and Suppressing Fire Using Wind Information", now U.S. Patent Publication No. US 2016-0328938 A1, all of which are incorporated herein by reference in their entirety.

BACKGROUND OF THE INVENTION

The hazardous industry sector including oil & gas, alcohol, paper, wood, coal, plastic etc. inherently is engaged in handling highly inflammable substances in both indoor and outdoor conditions. The fires involving these substances have a tendency to spread fast and get out of control very quickly, causing enormous damage to life and property. There is ever increasing demand to enhance the safety of personnel and valuable assets from accidental fires.

Early and reliable detection of fires coupled with fire suppression systems that can automatically initiate fire suppression before the first responders arrive on the scene can be effective to control the spreading of fire. For example, the FLAME Vision FV300 flame/fire detector can reliably detect fires with practically no false alarms over a range of distances.

Fog/jet monitors are high pressure systems that incorporate electrical motors which control the rotation of nozzles in the horizontal and vertical rotational axes and can dispense enormous quantities of water/foam over a range of distances.

SUMMARY OF THE INVENTION

The proposed invention provides solutions to several practical problems which impact the accuracy of locating the fire, monitoring the fire, and successfully suppressing the fire. These problems could be due, for example, to inherent limitations in the cross communication between detection, monitoring, and suppression of a fire.

In an embodiment of the present invention, fire detectors may be integrated with fog/jet monitors to rapidly detect and suppress fire over a range of distances. The FV300 or other video-based sensor (hence forth collectively referred to as fire detectors) provides an indication of a detected fire on a (planar) two-dimensional (2D) reference system. The fire detectors can output data which represent the center of a fire cluster as well as size of the fire cluster.

The proposed systems and method provide solutions to several practical problems which impact the accuracy of directing a fog/jet monitor towards a fire location. While prior solutions may have fulfilled the basic need of automatically directing the fog/jet monitor towards the fire, there has been no demonstration of how certain aspects of improved accuracy are provisioned.

In general according to one aspect, a fire detection system for determining a location of a fire includes a plurality of fire detectors for detecting the fire and generating location information. The fire detection system includes a system controller for determining an initial location of the fire based on the fire location information from the fire detectors, then determining a final location of the fire based on the fire location information taking into account spatial and/or angular relationships between the fire detectors and the initial location.

In embodiments, the system controller selects a few of the fire detectors that are closest to the initial location of the fire, and determines the final location based on the few fire detectors.

The few fire detectors are a pair of fire detectors, for example.

The system controller can select the few fire detectors based on a sum of the distances between the few fire detectors and the initial location of the fire. The final location can then be based on the weighted average of the location information from the fire detectors, the weighted average being based on distance between the fire detectors and the initial location of the fire.

In one embodiment, the system controller determines the final location based on an angular direction of the fire relative to the fire detectors.

In general, according to another aspect, the invention features a fire detection and suppression system that includes a plurality of fire detectors for detecting fire and generating location information. The fire detection and suppression system includes a plurality of monitors for suppressing the fire. The fire detection and suppression system includes a system controller that determines a location of the fire and activates the monitors to deploy suppressant based on a distance between each of the monitors and the location of the fire.

In general according to embodiments, the monitors are fog/jet monitors. The system controller can activate either a fog mode and/or jet mode of the fog/jet monitors based on a distance between each of the fog/jet monitors and the location of the fire.

In general, according to another aspect, the invention features a fire suppression system including a plurality of monitors for deploying fire suppressant onto a fire. The fire suppression system includes a suppressant monitoring system for monitoring the deployment of the fire suppressant. The fire suppression system includes a system controller that controls the monitors based on how the suppressant is deployed onto the fire.

Preferably, the system controller activates either fog mode and/or jet mode of the monitors based how the suppressant is deployed onto the fire.

In examples, the suppressant monitoring system has a video camera system. In one embodiment, the video camera system is a pan-tilt camera.

A dye can be added to the fire suppressant and the system controller analyzes video from the video camera system to track the dye in the video. In one embodiment, the dye includes fluorescent and/or phosphorescent material.

In other cases, the suppressant monitoring system includes a light pattern projection system that directs a light pattern at the suppressant deployed from the monitors and the video camera system tracks the suppressant based on the light pattern reflected by the suppressant. In one embodiment, the light pattern projection system includes a laser.

In general according to one aspect, a fire suppression method includes monitoring the deployment of the fire suppressant from monitors onto a fire, and controlling the monitors based on how the suppressant is deployed onto the fire.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
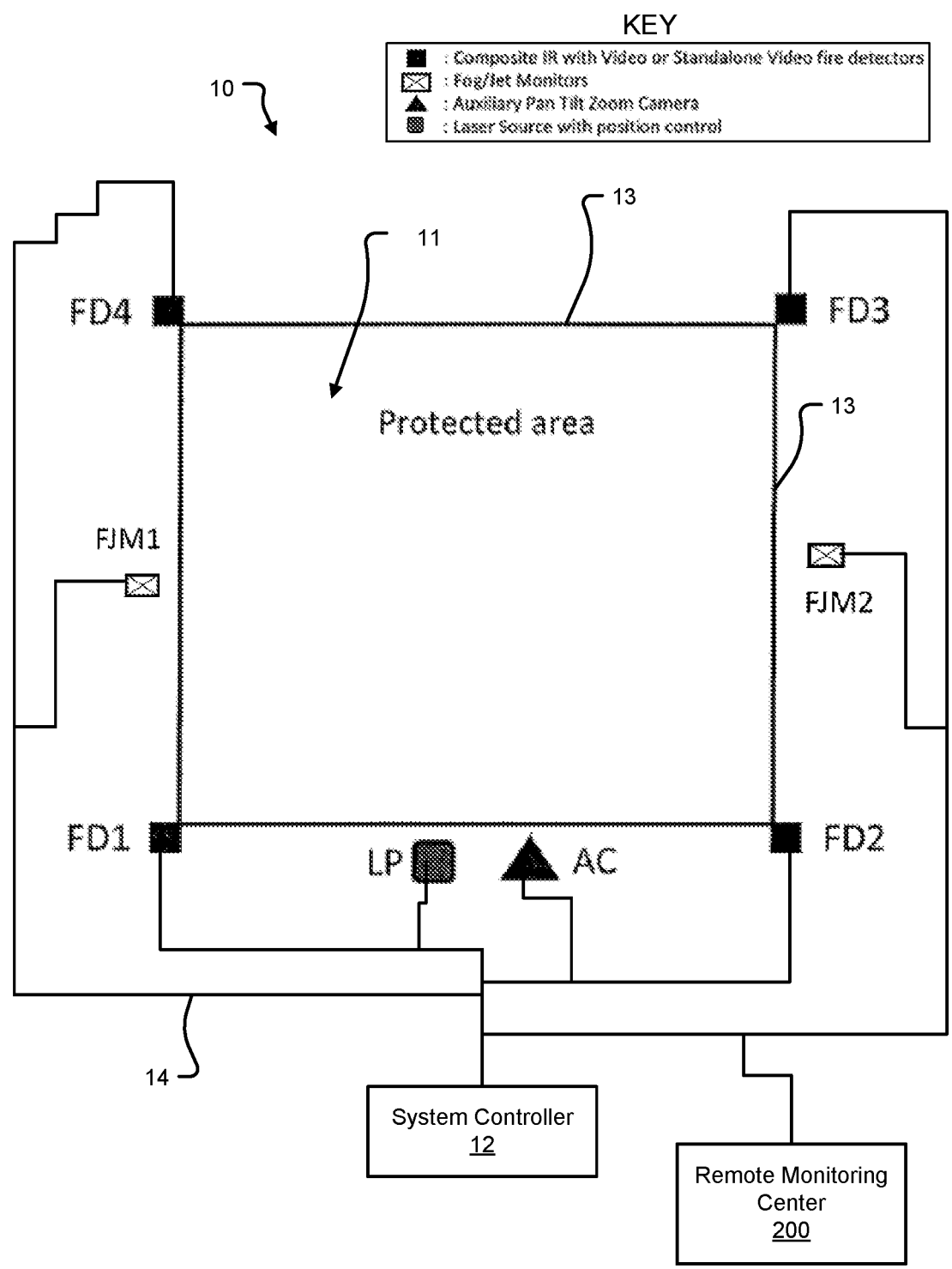
FIG. 1 is a schematic drawing of a fire detection and suppression system.

A reference layout of a fire detection and suppression system 10 is shown in FIG. 1.

The fire detection and suppression system 10 is installed around a perimeter 13 surrounding a protected area 11. The fire detection and suppression system 10 includes fire detectors FD1-FD4 positioned along the perimeter 13 of the protected area 11 to monitor this protected area 11 for fires. In this illustrated example, four fire detectors FD1-FD4 surround the protected area 11.

The fire detection and suppression system 10 further includes a fire detection and suppression network 14. The fire detection and suppression network 14 allows for communication between the fire detectors FD1-FD4 and a system controller 12.

The example fire detection and suppression system 10 also includes two fog/jet monitors FJM1-FJM2. These fog/jet monitors FJM1-FJM2 are in communication with the system controller 12 via the detection and suppression network 14 as shown in FIG. 1.

The fire detection and suppression system 10 further includes an auxiliary PTZ (pan, tilt, zoom) camera AC and a laser source LP with position control in communication with the fire detection and suppression network 14. The auxiliary PTZ camera AC and laser source LP are used as part of a trajectory monitoring system for the fog/jet monitors FJM1-FJM2 as discussed in further detail below.

The fire detection and suppression system 10 has a remote monitoring center 200 which can be embodied as a computer workstation providing display of analysis and other information related to detection, monitoring, and suppression of a fire. The remote monitoring center 200 is in communication with the fire detection and suppression network 14 and specifically the system controller.

Figure 2:
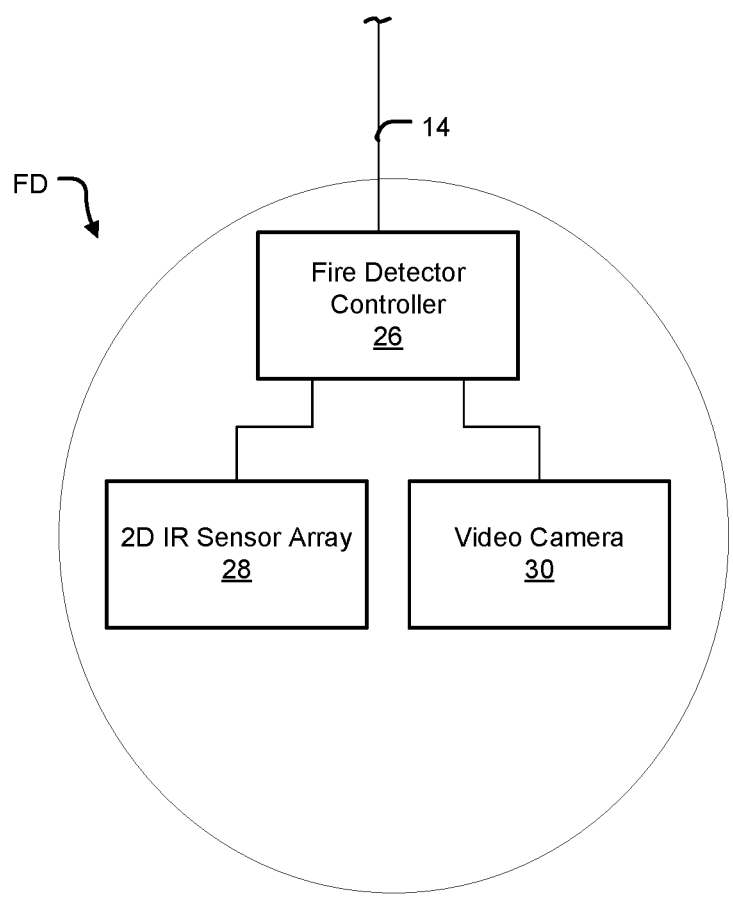
FIG. 2 is a block diagram of a fire detector.

As shown in FIG. 2, each of the first detectors FD includes two main components: a fire detector controller 26, and a two-dimensional (2D) infrared (FR) sensor array 28. A video camera 30 is further included in some embodiments. The fire detectors spatial resolution derives from their 2D detection capability based on the sensor array and/or the video camera.

The fire detectors FD are each capable of detecting fire based on specific sensing technologies such as infrared, thermal video, or a combination of these technologies. The fire detectors FD use the 2D IR sensor array 28 to detect fire using infrared technology. In particular, the fire detectors FD output the fire cluster information based on the response of the 2D IR sensor array 28. The group of sensors, i.e., pixels, on the 2D IR array that represent the detected fire are termed a fire cluster. This fire cluster information includes parameters related to a detected fire with reference to a 2D pixel array such as the center of the fire cluster within the 2D IR sensor array 28 and the size of the fire cluster being the number of sensors within the array that are in an alarm state, i.e., detecting IR radiation levels that exceed an alarm threshold.

The video camera 30 output is used to high-light the region of interest detected fire, using suitable graphics overlay based on the fire cluster information.

Figure 3A:
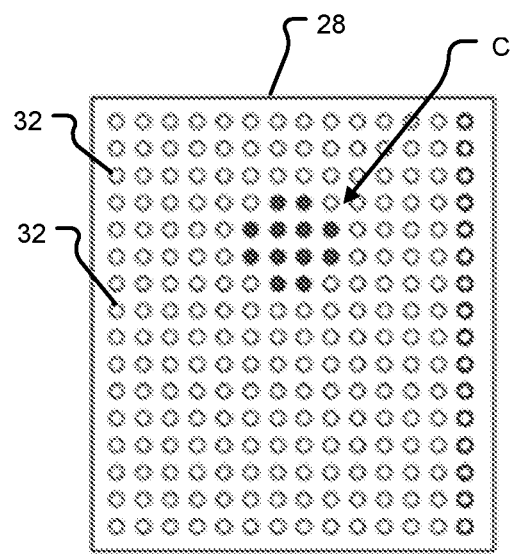
FIGS. 3A and 3B are schematic drawings of a two-dimensional infrared (IR) sensor array showing fire clusters and FIG. 3C is a false color IR image from the sensor array.
Figure 3B:
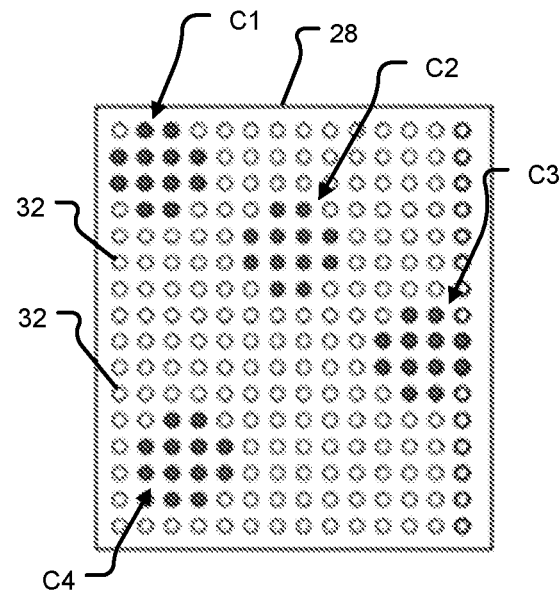
Figure 3C:
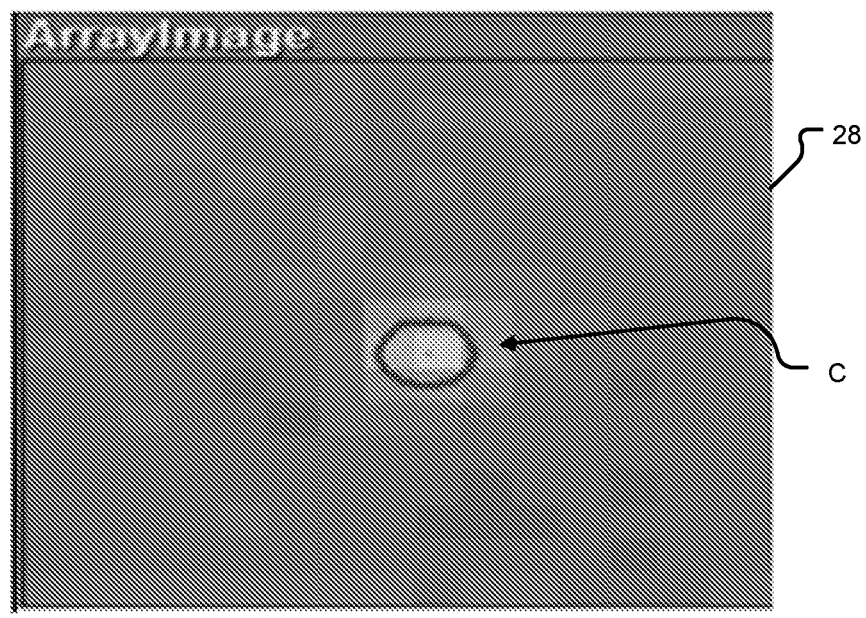

As shown in FIGS. 3A-3C, the IR sensor array 28 includes multiple IR sensors 32 that detect fire clusters C. In one particular example, the 2D IR sensor array 28 includes a 16 by 16 array of IR sensors 32 (e.g., highly sensitive pyro electric sensors) that detect if infrared light is of sufficient intensity and form to be indicative of a fire by reference to an alarm threshold. FIG. 3A illustrates a 2D IR sensor array 28 detecting one active fire cluster C and FIG. 3B illustrates a 2D IR sensor array 28 detecting multiple active fire clusters C1-C4.

FIG. 3C shows a coarse resolution IR image generated by the sensor array 28. It shows a single fire cluster C.

The fire cluster(s) C detected by the 2D IR sensor array 28 is (are) used in generating 2D fire location data for each fire giving rise to a fire cluster. Each fire detector FD outputs this fire cluster information, which includes fire cluster center, fire cluster size, and fire cluster alarm status information.

Figure 4:
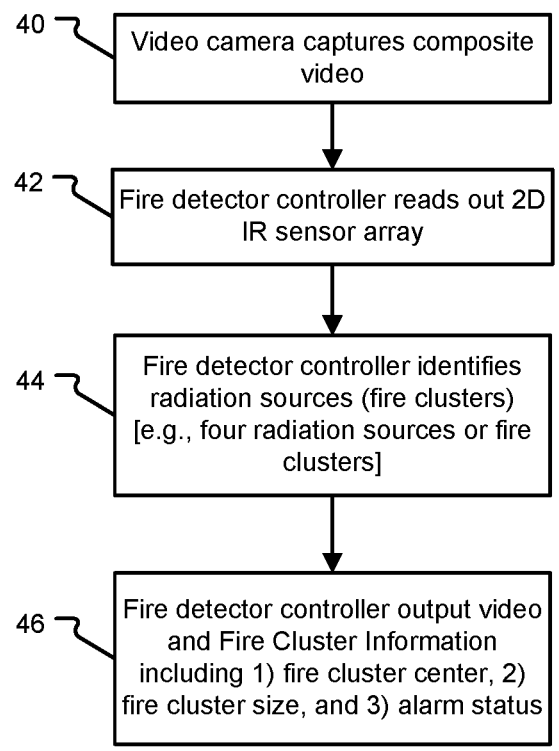
FIG. 4 is a flowchart illustrating the steps performed by the fire detector to detect a fire.

Each fire detector FD generates fire cluster information using the process shown in FIG. 4. In step 40, the video camera 30 captures composite video. Then, in step 42, the fire detector controller 26 reads out the 2D IR sensor array 28. The fire detector controller 26 identifies radiation sources (i.e., fire clusters) (step 44) by comparing each sensor response to an alarm threshold. In step 46, the fire detector controller 26 outputs video and fire cluster information including 1) fire cluster center, 2) fire cluster size, and 3) alarm status, which are sent to the controller 12 over the network 14.

Figure 5:
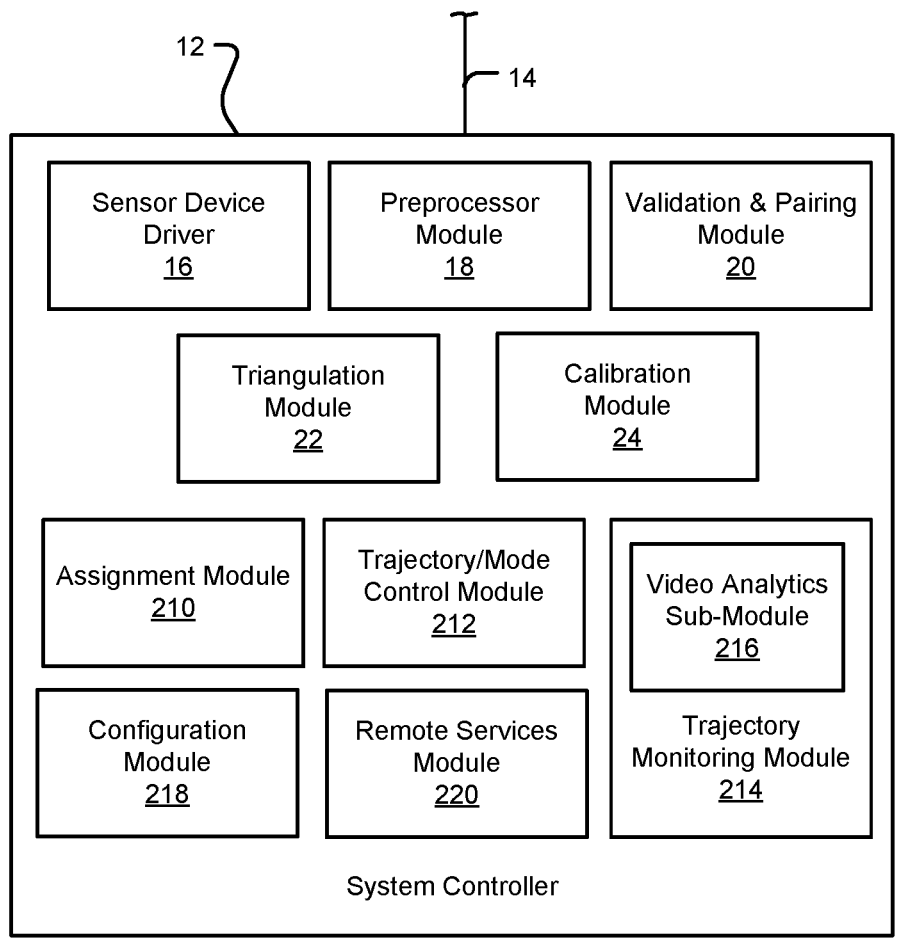
FIG. 5 is a block diagram of a system controller including functional components for implementing the detection, monitoring, and suppression of a fire.

The system controller 12 includes a number of functional components shown in the FIG. 5 block diagram. The functional components include: a sensor device driver 16, a preprocessor module 18, a validation & pairing module 20, a triangulation module 22, a calibration module 24, an assignment module 210, a trajectory/mode control module 212, a configuration module 218, a remote services module 220, and a trajectory monitoring module 214. The trajectory monitoring module 214 includes a video analytics sub-module 216.

The assignment module 210 does the optimal selection of one or more fire detector pairs (e.g., FD1/FD2) to be used in triangulating a fire location. This decision by the assignment module 210 is based on a set of selection rules. One of the manifestations of a selection rule can be selection of a three-dimensional fire location output based on the physically nearest pair of fire detectors to a fire. This selection rule is based on knowledge that the accuracy of the two dimensional location data decreases as a function of distance from the fire. Also, the assignment module 210 maps or assigns one or more unique fog/jet monitors FJM from a set of fog/jet monitors FJM based on a set of rules. For example, one rule can include selecting the fog/jet monitor FJM closest to the fire to suppress the fire. Another rule can be the selection of a jet mode or a fog mode for the selected fog/jet monitor FJM to suppress the fire based on the distance between the fog/jet monitor FJM and the fire location.

Figure 6:
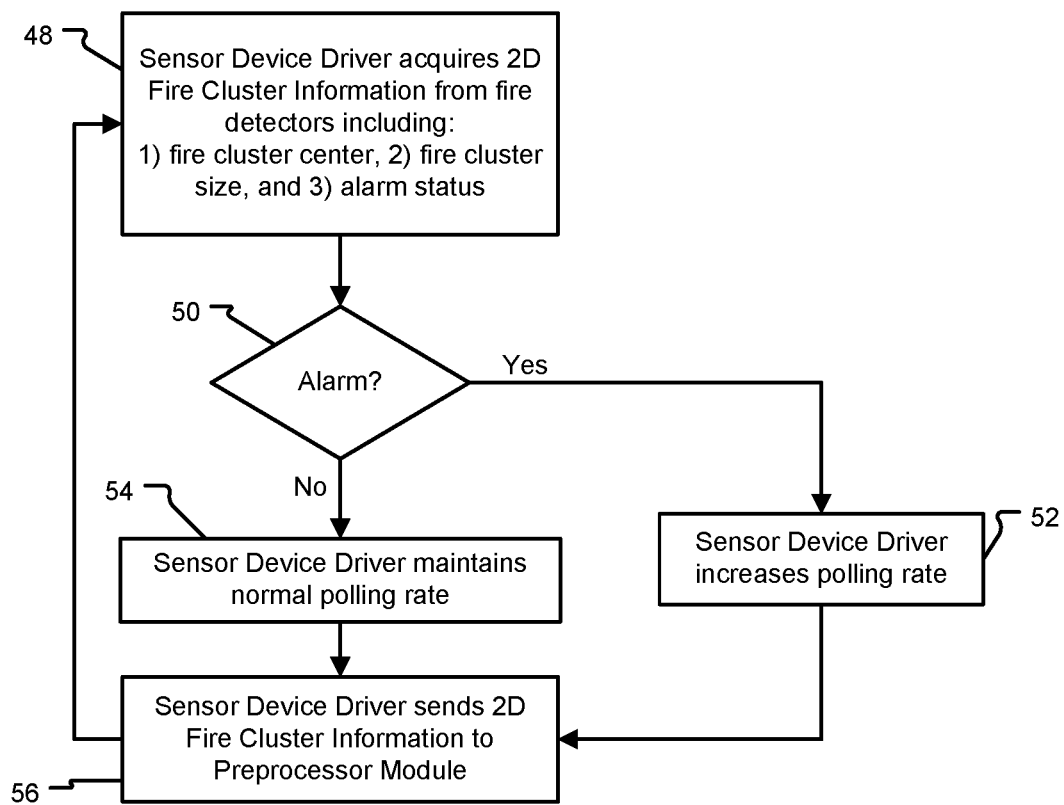
FIG. 6 is a flowchart illustrating the steps performed by a device driver of the system controller.

As shown in FIG. 6, the sensor device driver 16 acquires the 2D fire cluster information (fire cluster center, fire cluster size, and alarm status) from the fire detectors FD (step 48). In step 50, the sensor device driver 16 detects if there is an alarm condition in the fire cluster information. If an alarm condition is detected, the polling rate is increased to acquire fire cluster information (e.g., 2D fire location samples) more frequently from the fire detectors FD (step 52). Otherwise, if no alarm is detected, the sensor device driver 16 maintains a normal polling rate (step 54). At step 56, the sensor device driver 16 sends the received 2D fire cluster information to the preprocessor module 18.

Figure 7:
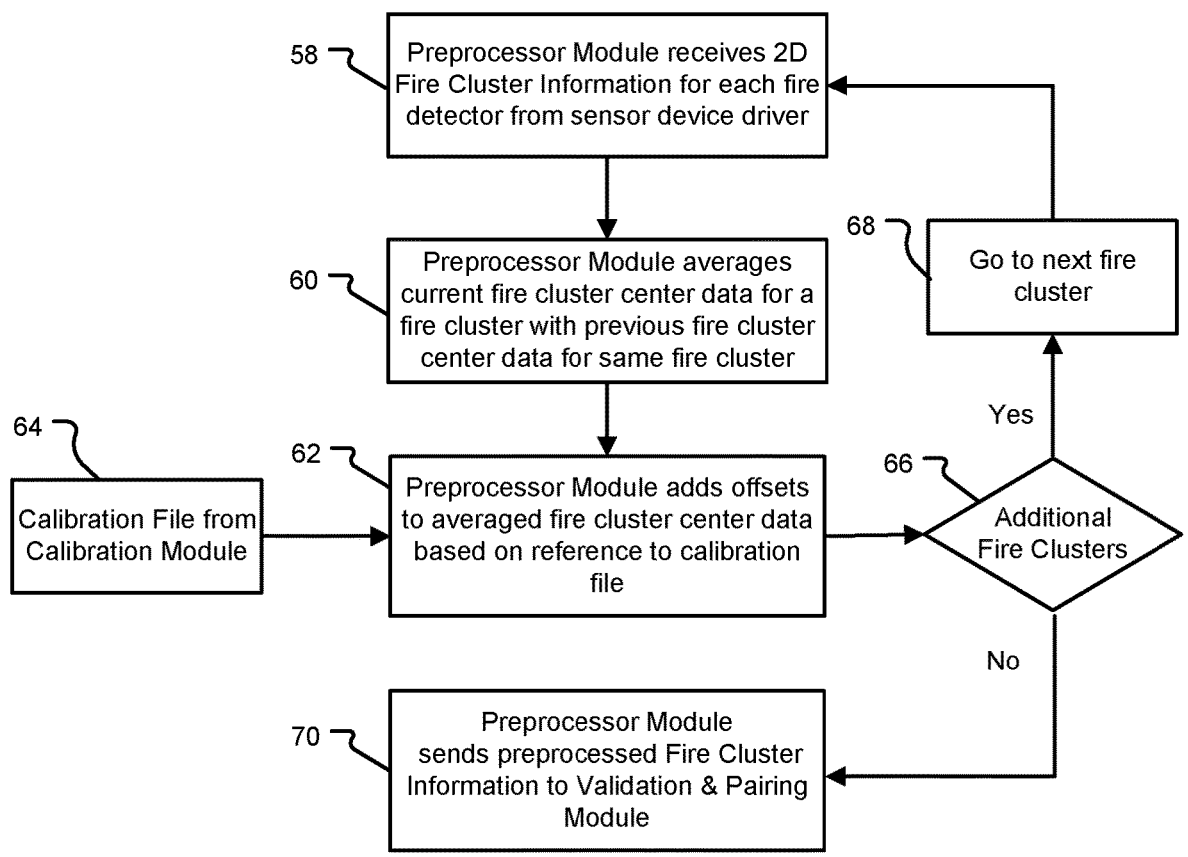
FIG. 7 is a flowchart illustrating the steps performed by a preprocessor module of the system controller.

As shown in FIG. 7, the preprocessor module 18 receives 2D fire cluster information for each fire detector FD from the sensor device driver 16 (step 58). In step 60, the preprocessor module 18 averages current fire cluster center data for a fire cluster C with previous fire cluster center data for the same fire cluster C. In one implementation, the preprocessor module 18 averages fire location data over configurable time windows in order to reduce the effects of wind-induced noise in the cluster center information. In step 62, the preprocessor module 18 adds offsets to averaged fire cluster center data based on reference to a calibration file. The calibration file is received by the preprocessor module 18 from the calibration module 24 (step 64). In particular, these offsets may be derived, for example, from a calibration or sensor alignment process which is undertaken on standalone fire detectors FD or during installation.

In step 66, the preprocessor module 18 determines if there are additional fire clusters C. If there are additional fire clusters C, the next fire cluster C is run through steps 58-62 of the preprocessor module 18 (step 68). If there are no additional fire clusters C, the preprocessor module 18 sends the preprocessed fire cluster information to the validation & pairing module 20.

Figure 8:
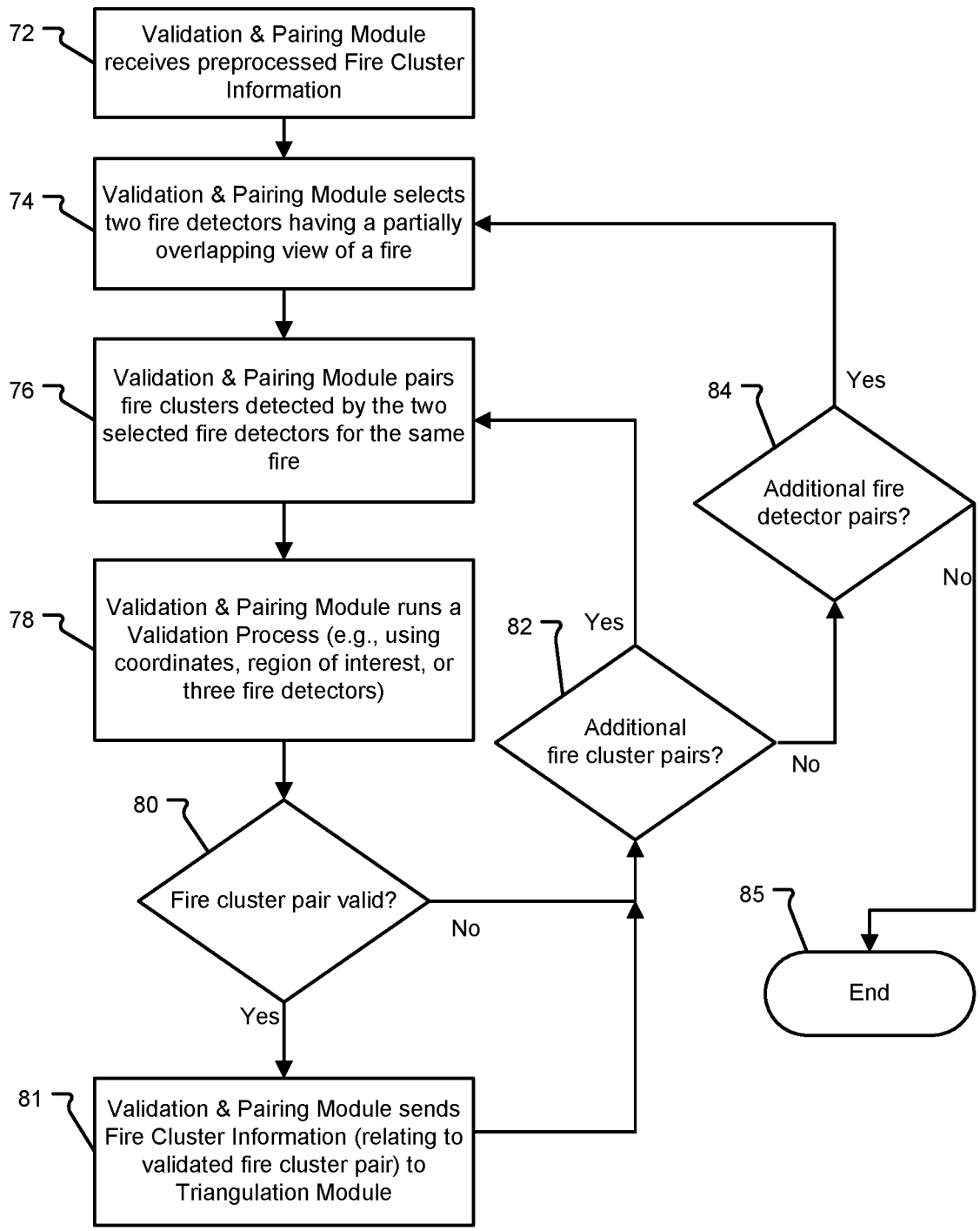
FIG. 8 is a flowchart illustrating the steps performed by a validation & pairing module of the system controller.

As shown in FIG. 8, the validation & pairing module 20 receives the preprocessed fire cluster information in step 72. In step 74, the validation & pairing module 20 selects two fire detectors FD1, FD2 as having a partially overlapping view 15 of a Fire (see FIG. 9). This partially overlapping view 15 (i.e., common field of view) is based on overlap between the field of view FOV-1 of the first fire detector FD1 and the field of view FOV-2 of the second fire detector FD2. The validation & pairing module 20 pairs fire clusters C detected by the two selected fire detectors FD1, FD2 for the same fire (step 76). In step 78, the validation & pairing module 20 runs a validation process (e.g., using coordinates, region of interest, or three fire detectors). The validation process 78 is utilized to consistently pair fire clusters C that represent a unique fire.

The validation process 78 ensures that only consistently paired fire cluster data is further passed along to a triangulation algorithm of the triangulation module 22. Based on the validation process 78, the fire cluster pair is either valid or invalid (step 80). The validation & pairing module 20 then determines, at step 82, if there are additional fire cluster pairs and if so steps 76 and 78 are repeated for the new pair. If there are no additional fire cluster pairs, the validation & pairing module 20 determines if there are additional fire detector pairs at step 84 and if so steps are repeated to validate fire cluster pairs for the new fire detector pair. Otherwise, the process ends at step 85. If the fire cluster pair is valid, the validation & pairing module 20 sends the fire cluster information (relating to validated fire cluster pair) to the triangulation module 22.

Figure 9:
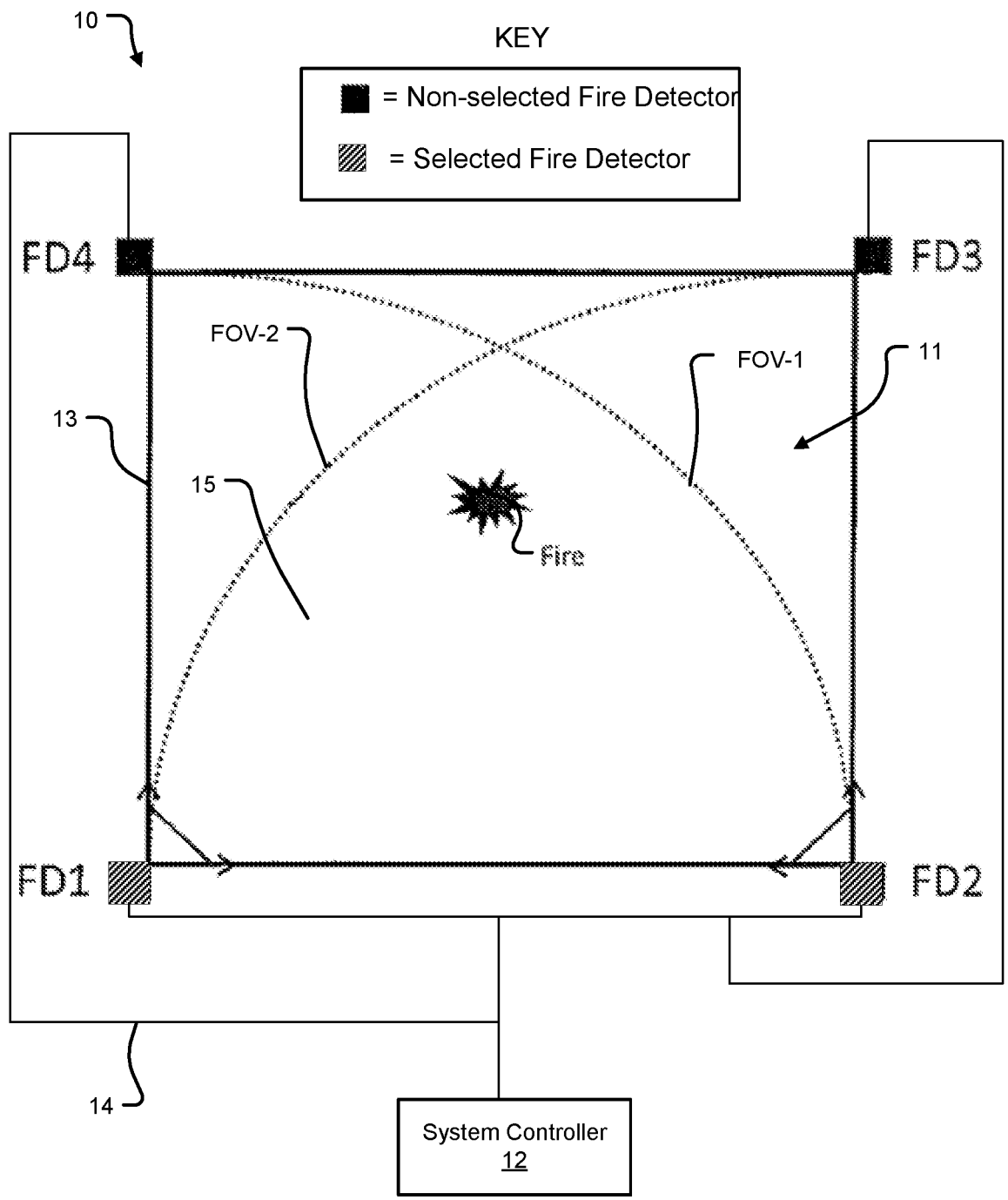
FIG. 9 is a schematic drawing of the fire detection system including two fire detectors having a partially overlapping view (i.e., common field of view) of a fire.

In one example, the validation of fire cluster pair relies on sensor placement geometry. A pair of fire detectors FD1, FD2 is involved along with a triangulation algorithm to compute the fire location when the fire occurs in their partially overlapping view 15 (i.e., common field of view). This partially overlapping view 15 or common field of view is between the first fire detector's field of view FOV-1 and the second fire detector's field of view FOV-2 as shown in the example of FIG. 9. The triangulation algorithm of the triangulation module 22 uses a pair of fire clusters C as input, each of which appear in the individual fire detectors FD1, FD2 of the detectors pair.

The validation and pairing module ensures that this input fire cluster pair corresponds to a unique fire. Otherwise, the incorrect pairing of fire clusters C leads to improper computation of a fire location. Therefore, the pair of fire clusters needs to be validated prior to input to the triangulation module 22.

Figure 10A:
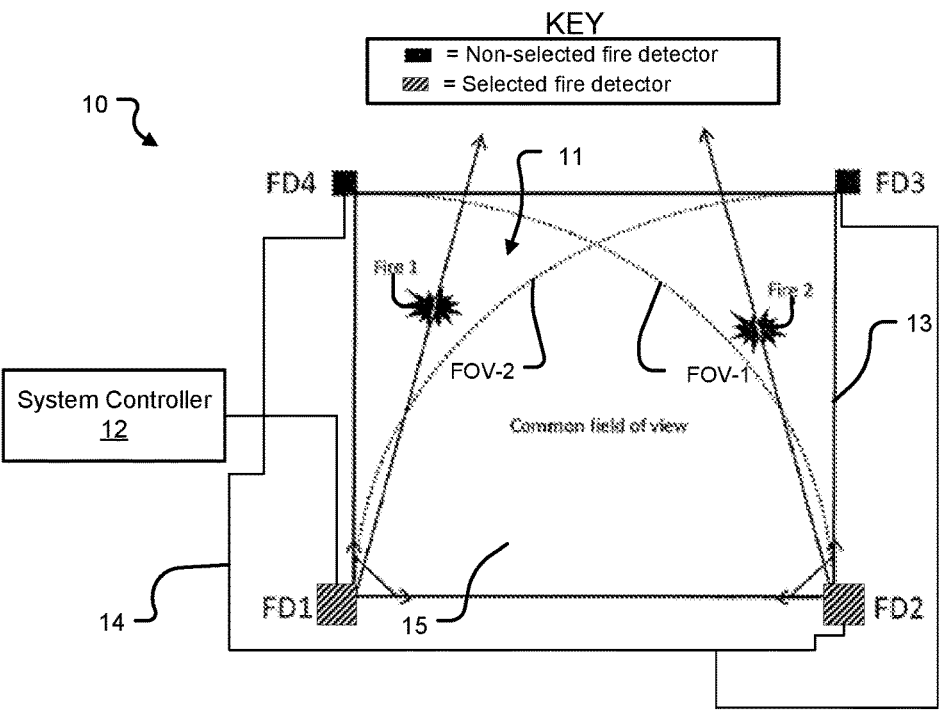
FIGS. 10A, 10B and 11 are schematic drawings of the fire detection system impacted by the phenomena of fire cluster discrepancy, fire cluster center offset, and ambiguity in pairing fire clusters.

Some of the likely phenomena that may cause the incorrect pairing of the fire clusters C are cluster discrepancy (FIG. 10A), cluster center offset (FIG. 10B), and cluster enumeration ambiguity (FIG. 11), which are described below.

In case of multiple fires (Fire 1 and Fire 2) and when all fires are not detected by both fire detectors FD1, FD2, then a pair of fire clusters reported by the fire detectors FD1, FD2 may not refer to the same fire. For example, the first fire detector FD1 refers to Fire 1 and the second fire detector FD2 refers to Fire 2 as in FIG. 10A. This is termed as the cluster discrepancy for the triangulation algorithm. If such fire clusters C are paired and processed by the triangulation algorithm, it results in the triangulation algorithm locating a phantom fire. The cluster discrepancy may be more obvious in case of small fires and in case of fires that are not visible by both fire detectors FD1, FD2.

Figure 10B:
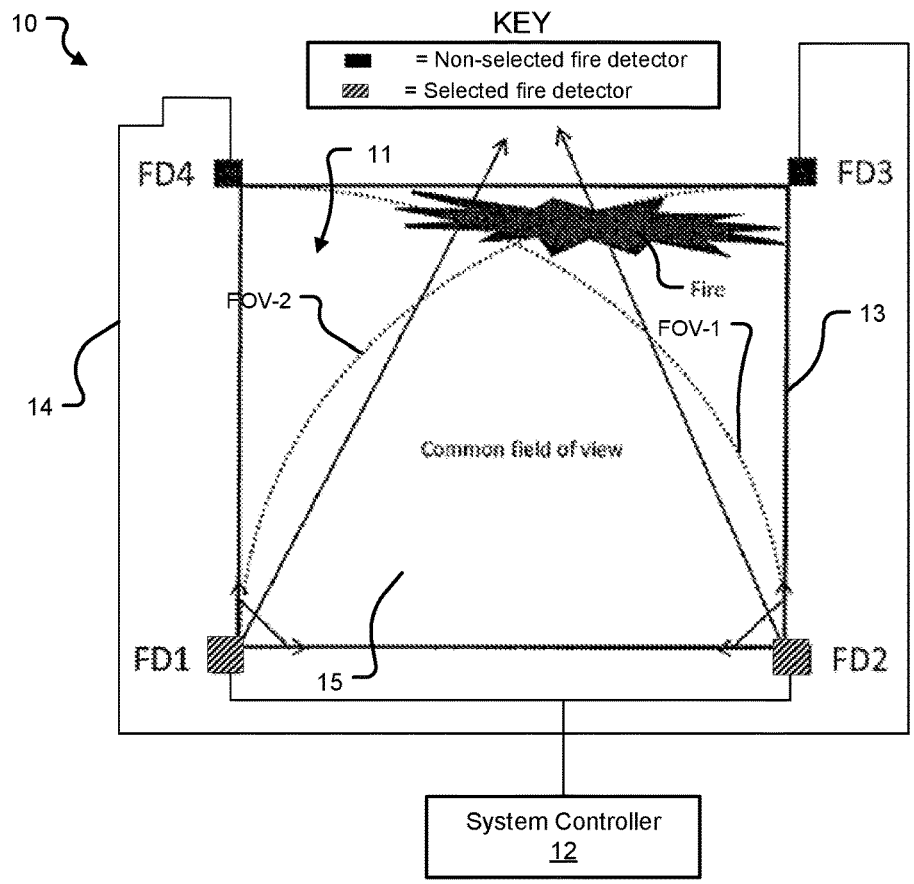

In case of a large fire, each of the fire detectors FD1, FD2 may not have complete visibility of the fire as shown in FIG. 10B. In such cases, fire detectors FD1 and FD2 may output cluster centers that are not truly representative of the center of the fire. Consequently, the reported cluster centers will have an associated error.

Figure 11:
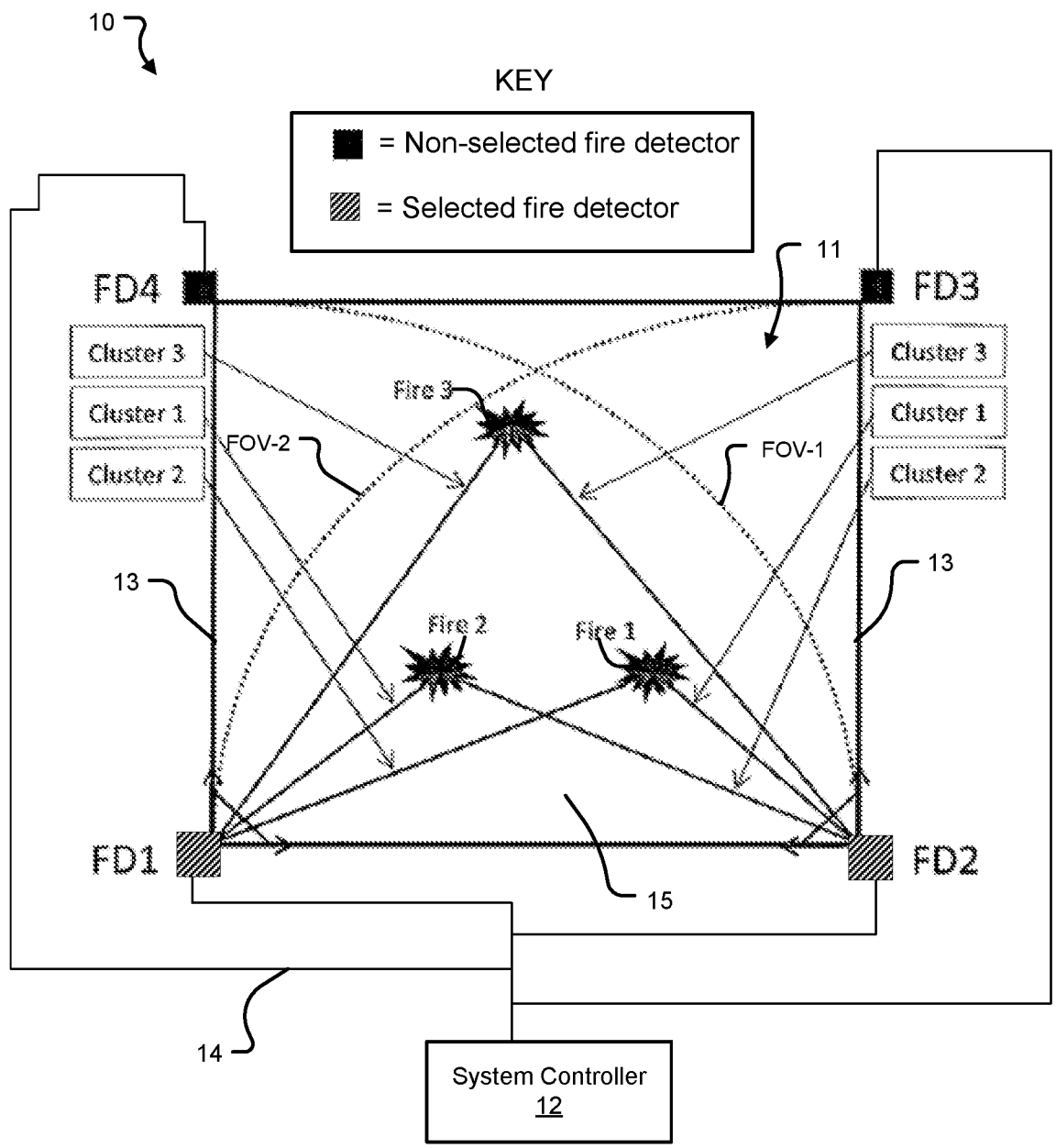

In case of multiple fires (Fire 1, Fire 2, and Fire 3) and when multiple fire clusters (fire clusters 1, 2, and 3) are reported by the fire detectors FD1, FD2, there may be cluster enumeration ambiguity. The enumeration order of the fire clusters 1-3 for the fire sources (Fires 1-3) might be different in different fire detectors FD. For example, the fire reported by cluster1 of the first fire detector FD1 may not be the same fire reported by cluster1 of the second fire detector FD2. FIG. 11 illustrates Fire 1 as represented by cluster2 on the first fire detector FD1 and cluster1 on the second fire detector FD2. Fire 2 is represented by cluster1 on the first fire detector FD1 and cluster2 on the second fire detector FD2. Fire3 is represented by cluster3 on the first fire detector FD1 and cluster3 on the second fire detector FD2. The reasons for different enumeration of the same fire in different fire detectors FD1, FD2 are—distance of fire from fire detectors FD1, FD2, difference in perceived fire intensity, and fields of view FOV-1, FOV-2 of the fire detectors FD1, FD2. This ambiguity is termed as cluster enumeration ambiguity.

The following validation process 78 is applied to each fire cluster pair to ensure that the fire cluster pair refers to the same fire.

Figure 12:
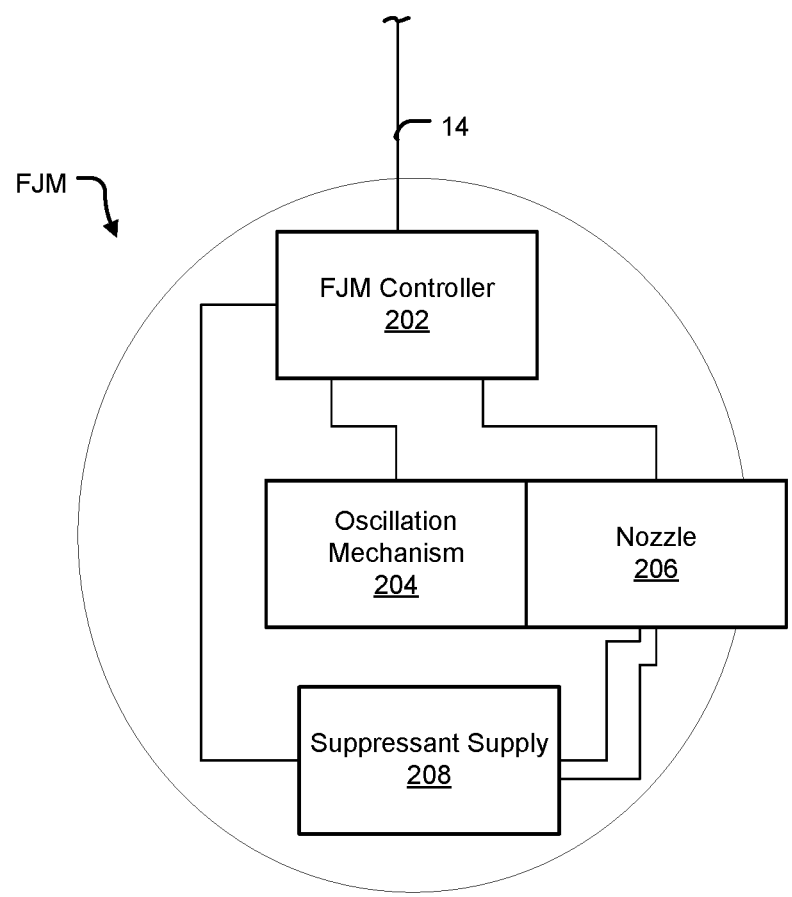
FIG. 12 is a block diagram of a fog/jet monitor.

As shown in FIG. 12, each fog/jet monitor includes the following components: FJM controller 202, positioning and oscillation mechanism 204, nozzle 206, and a suppressant supply 208.

The FJM controller 202 directs movement of the positioning and oscillation mechanism 204. The positioning and oscillation mechanism 204 positions the nozzle 206 (e.g., horizontal and/or vertical positioning) in a direction towards a fire.

The FJM controller 202 activates the suppressant supply 208 to provide suppressant to the nozzle 206 when the fog/jet monitor FJM has been activated for use in suppressing a fire. This suppressant supply 208 can be provided at a range of pressures to the nozzle 206 based on whether the fog/jet monitor is in jet mode or fog mode. Also, the suppressant pressure can be adjusted based on the distance between the fog/jet monitor FJM and the fire.

Oscillation of the fog/jet monitor FJM using the oscillation mechanism 204 allows for the fog/jet monitor FJM trajectory to spread the suppressant about the mean of the fire location. The extent of oscillation of the fog/jet monitor FJM may vary based on the size of the fire and distance of the fire from the fog/jet monitor FJM.

The trajectory/mode control module 212 computes the required horizontal and vertical positioning for the fog/jet monitor nozzle 206 such that the nozzle 206 points towards the direction of the fire. The trajectory/mode control module 212 can utilize a pre-characterized look-up table or a continuous function or algorithm to achieve the required throw range based on the distance of the fire. The elevation angle of the nozzle 206 also depends upon the composition of the suppressant (percentage of foam). The trajectory/mode control module 212 determines the oscillation range in both horizontal and vertical directions using the positioning and oscillation mechanism 204 is based on both certain rules as well as wind speed and wind direction.

In a preferred embodiment, a feedback mechanism is used to determine whether the fire suppressant is being accurately delivered to the location of the fire. For example, the trajectory monitoring module 214, shown in FIG. 5, evaluates whether the foam and/or water jet is appropriately directed onto a fire. Further, the effective suppression of a unique fire can be inferred by de-assertion of the corresponding fire cluster reported by the fire detectors FD (e.g., FD1 and FD2) which reported the fire.

Other feedback techniques may include, for example, adding a colored and/or fluorescent additive to the suppressant and determining if the corresponding colored additive is visible in a region of interest by video analytics. Another feedback technique can include a multi-point laser pattern (e.g., laser beam projects vertices of a geometrical shape such as a triangle, square, hexagon, or finite number points along the circumference of a circle) directed towards a region of interest (i.e., fire location) and video analysis is performed in the region of interest to determine if the trajectory is on target. Fire detectors FD such as the FV300 can use IR sensors for fire detection while also providing a video output which can display the IR sensor's field of view. As an example, when a fire detector FD is in an alarm state as a result of a valid fire in its field of view, a bounding box (i.e., region of interest is overlaid on the fire in the video output of the fire detector FD as supervisory information. This function is provided by the video analytics subsystem 216. The trajectory monitoring module 214 uses the video analytics sub-module 216 to analyze the video feedback of the trajectory to determine if the fog/jet monitor FJM is effectively suppressing a fire in the region of interest.

As shown in FIG. 5, the system controller 12 includes a remote services module 220. The remote services module 220 is implemented to send alarm status and supervisory video information to a command and control center (e.g., remote monitoring center 200 via the fire detection and suppression network 14). The remote services module 220 can receive commands to automatically switch over from automatic to manual triodes, etc. The remote services module 220 is described in further detail below.

The system controller 12 also includes a configuration module 218 which is used to generally configure the system controller 12 with information about the physical and relative positions of the fire detectors FD and fog/jet monitor FJM. The configuration module 218 is described in further detail below.

When the fog/jet monitor FJM receives the triangulated fire location information from a system controller 12 or the fire detectors FD, it orients itself pointing the FJM nozzle 206 toward the fire location and throws the suppressant into the fire. The positioning and oscillation mechanism 204 positions the fog/jet monitor FJM (particularly the nozzle 206) in left/right and top/down directions within a specified range to address the following issues.

Compensate any inaccuracy in the triangulated output of a fire location based on certain fire detectors FD;
Compensate any inaccuracy of the fog/jet monitor's own position and orientation;
Compensate any inaccuracy of the fog/jet monitor's positioning towards the fire location;
Restrict the fire to spread into its neighborhood area (i.e., extended region of interest);
To completely extinguish the fire in case of a big fire;
To completely extinguish any small fire near the detected fire.

Every time a fire is suppressed successfully by the fog/jet monitor FJM, fire detection and suppression system 10 can track and record or save this experience. For example, the auxiliary PTZ camera AC or fire detector FD can develop a video footage or create a loop diagram of various actions involved in the fire suppression pertaining to time and hazard severity. This can be used as a pattern in the intelligent system. When a similar fire breaks out in the future, this loop of the pattern can be used by the fog/jet monitor FJM to speed up the process of suppressing the fire. This will help to improvise the intelligent fog/jet monitor FJM behavior and also improvise safety precautions in similar types of hazard areas.

With a fire detector FD that outputs fire location information on a 2D array, the accuracy of the fire detector FD across the horizontal field of view is a function of the number of horizontal sensing elements in the pixel array for the fire detector FD. Consequently, the error for detected cluster center data is larger as the distance increases between the fire and the fire detector FD. Hence, the triangulated fire location outputs using such 2D data also exhibit larger deviations from the actual fire positions. There is an opportunity in certain system configurations, where more than two fire detectors FD are employed with shared field of view, to determine an optimal pairing of fire detectors FD to minimize such error in 2D data.

For example, the system controller 12 can determine an initial location of a fire based on fire location information from fire detectors FD. Then, the system controller 12 can determine a final location of the fire based on the fire location information taking into account spatial and/or angular relationships between the fire detectors and the initial location.

One of the embodiments includes optimal detector pair selection for a given fire based on a computation of sum of distances of a unique fire for all combinations of fire detector pairs (e.g., FD1/FD2) that have a visibility of this fire. Following this determination, a selection rule is implemented to determine the fire detectors FD that result in the minimum sum of distances to the given fire. The selected fire detectors are used to determine a more accurate fire location that can be further used to direct and position the FJM nozzle.

Figure 13A:
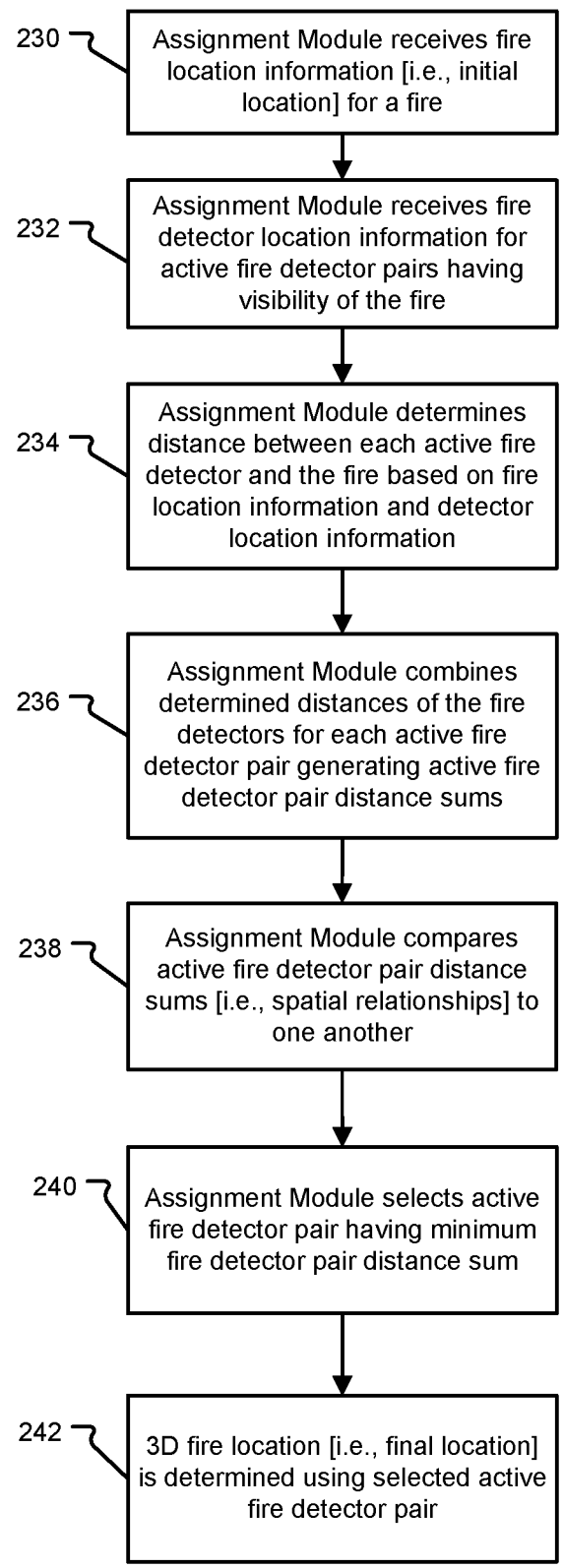
FIG. 13A is a flowchart illustrating the steps performed by the assignment module for selecting an optimal fire detector pair based on minimum distance to a fire.

For example, FIG. 13A is a flowchart illustrating the steps performed by the assignment module 210 for selecting optimal fire detector pairs based on distance (i.e., spatial relationship). In step 230, the assignment module 210 receives fire location information (i.e., initial location) for a fire. Then, in step 232, the assignment module 210 receives fire detector location information for active fire detector pairs having visibility of the fire.

In step 234, the assignment module 210 determines the distance between each active fire detector FD and the fire based on fire location information and detector location information. The assignment module 210 combines the determined distances of the fire detectors FD for each active fire detector pair generating active fire detector pair distance sums (step 236). In step 238, the assignment module compares active fire detector pair distance sums to one another (i.e., comparing spatial relationships). The assignment module selects the active fire detector pair having the minimum fire detector pair distance sum (step 240). In step 242, the 3D fire location (i.e., final location) is determined using the selected active fire detector pair.

Figure 15:
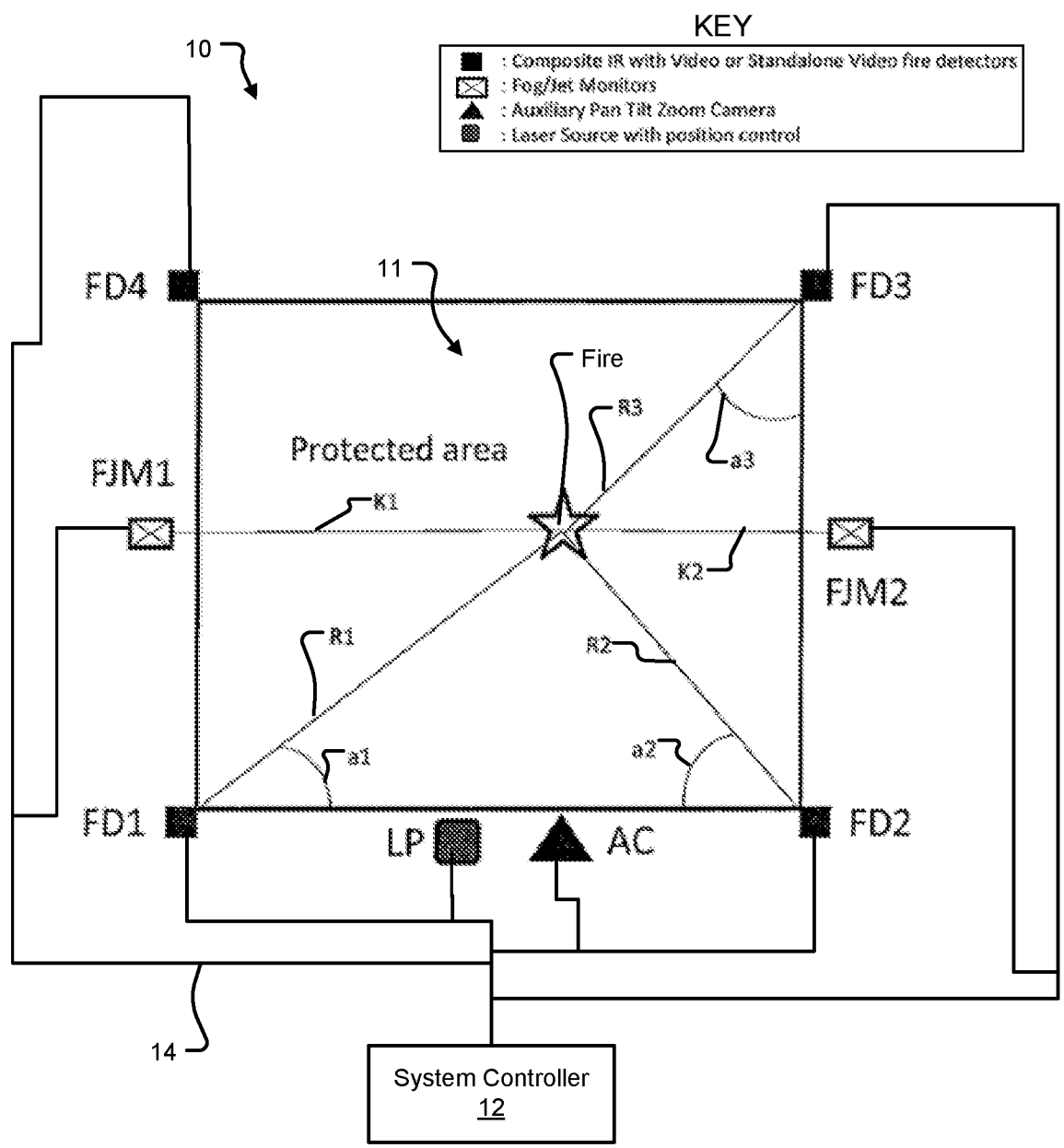
FIG. 15 is a schematic drawing of the fire detection and suppression system optimally selecting a fire detector pair and optimally selecting a fog/jet monitor based on spatial relationships and/or angular relationships to a fire.

As shown in FIG. 15, Exemplary Rule 1:

If $(R1+R2)<(R2+R3)$

Then, select the fire detector pair FD1 and FD2 to compute a triangulated 3D fire location
Else select the fire detector pair FD2 and FD3 to compute triangulated 3D fire location
Where R1=Distance of the fire from first fire detector FD1; R2=Distance of the fire from second fire detector FD2; and R3=Distance of the fire from third fire detector FD3

There could be alternative approaches to the selection process described above. In another embodiment, the 3D fire location is determined as a weighted average of the fire locations reported by all legitimate combinations of fire detectors FD. The weights can be adjusted dynamically based on the distances or sum of distances of the fire detectors FD from the fire.

Figure 13B:
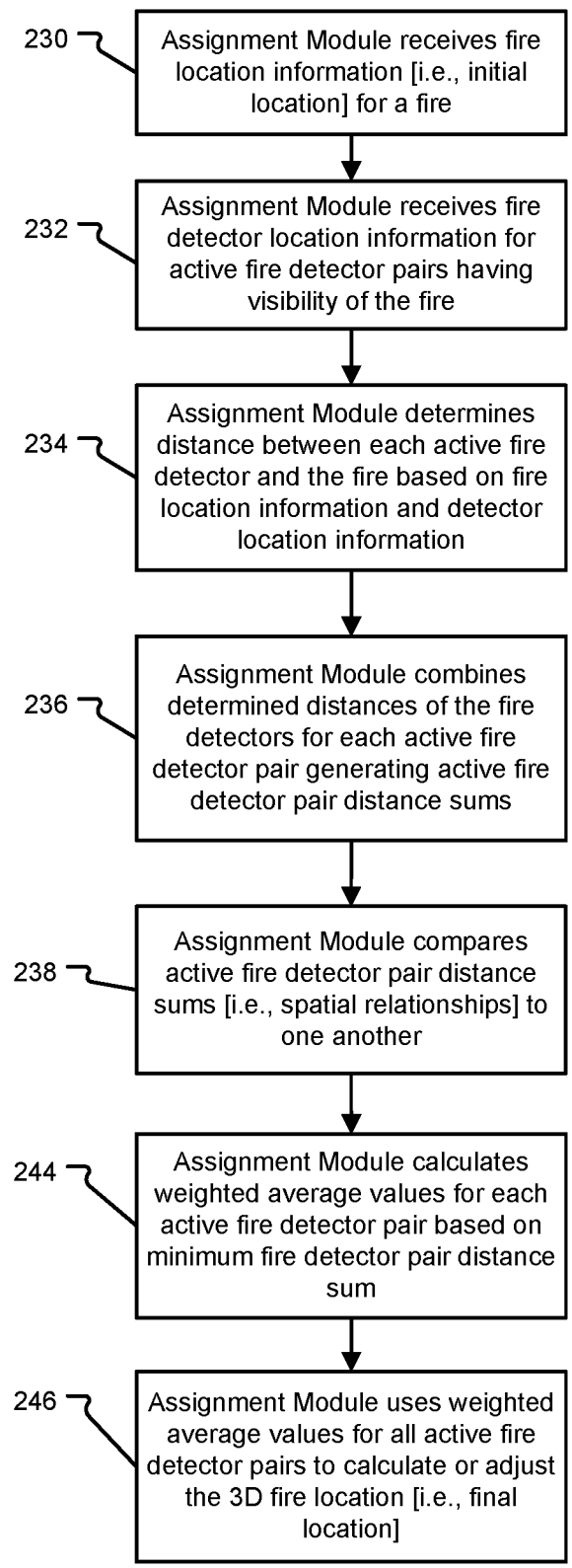
FIG. 13B is a flowchart illustrating the steps performed by the assignment module for using a weighted average fire detection process to determine or correct a 3D fire location.

For example, as illustrated in FIG. 13B, a similar optimizing process includes steps performed by the assignment module 210 for using a weighted average fire detection process to determine or correct a 3D fire location. Steps 230-238 for this process are the same as the steps used in the process illustrated in FIG. 13A. After step 238, the assignment module 210 calculates weighted average values for each active fire detector pair based on minimum fire detector pair distance sum (step 244). In step 246, the assignment module 210 uses the weighted average values for each active fire detector pair to calculate or adjust the 3D fire location (i.e., final location).

In another embodiment if fire location accuracy of the fire detectors FD is known to be less accurate for fires which are located at positions farther away from the principal axis then a different criteria can be applied to determine the optimal selection of the fire detector pair based on the angle of incidence a1, a2 of the fire with respect to the fire detectors FD. As shown in FIG. 15, angle a1 is the angle of incidence for the first fire detector FD1 and angle a2 is the angle of incidence for the second fire detector FD2.

Figure 13C:
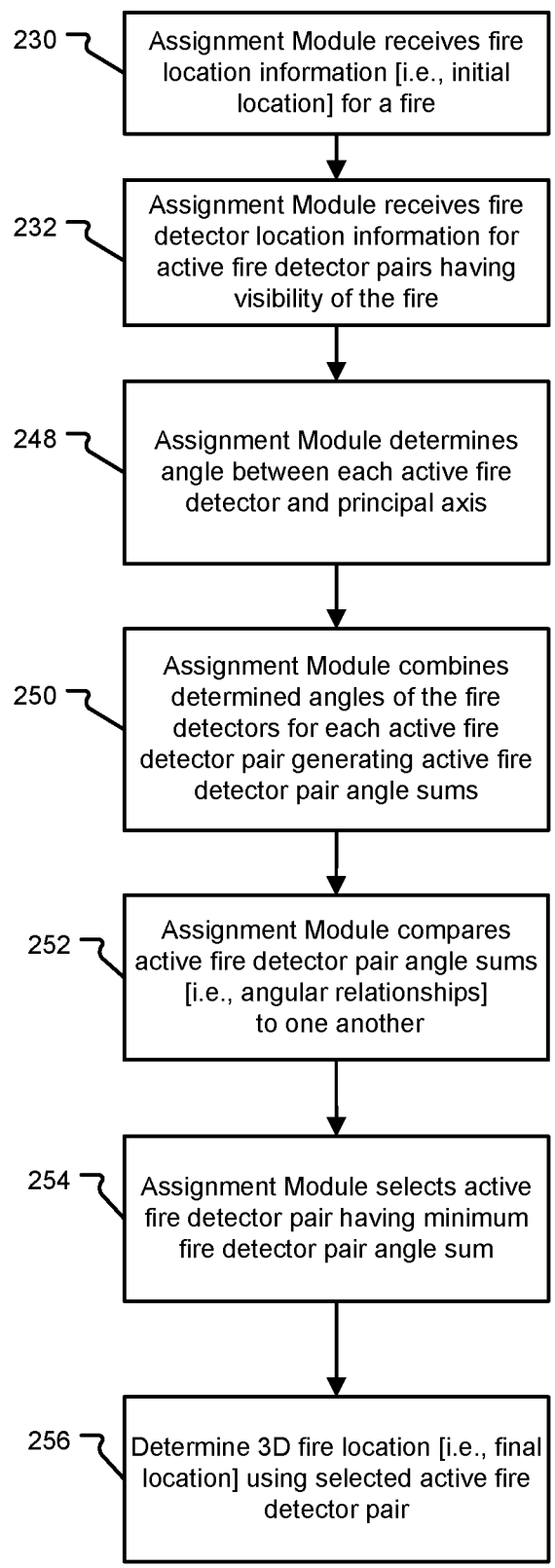
FIG. 13C is a flowchart illustrating the steps performed by the assignment module for selecting an optimal fire detector pair based on angle.

FIG. 13C illustrates the steps performed by the assignment module for selecting an optimal fire detector pair based on angle (i.e., angular relationship). Initial steps 230-232 for this process are the same as the steps used in the processes illustrated in FIGS. 14A-14B. After step 232, the assignment module 210 determines the angle (e.g., a1, a2) between each active fire detector FD and a principal axis (step 248). Then, in step 250, the assignment module 210 combines determined angles of the fire detectors FD for each active fire detector pair generating active fire detector pair angle sums. In step 252, the assignment module 210 compares active fire detector pair angle sums to one another (i.e., comparing angular relationships). The assignment module 210 selects active fire detector pair having the minimum fire detector pair angle sum (step 254). Then, at step 256, the 3D fire location is determined using the selected active fire detector pair.

The fire location information output from the triangulation algorithm of the triangulation module 22 is subsequently used by a fog/jet monitor control system to activate the fog/jet monitor system. There are opportunities to optimize and improve the effectiveness of the suppression subsystem accuracy based on certain techniques as below.

The fog/jet monitors FJM operate in fog or jet modes. The position of the fire location relative to the fog/jet monitor FJM determines the optimal operating mode to suppress the fire in question. At distances close to the fog/jet monitor FJM, it might be optimal to use the fog mode of operation where a very large area is covered. At distances farther from the fog/jet monitor FJM, it might be optimal to use the jet mode of operation where the fog/jet monitor FJM nozzle 206 is pointed towards the fire and suitably elevated so that the resulting trajectory of the suppressant will be effective in suppressing the fire.

There are situations where there are more than one fog/jet monitors FJM employed on a site. In such situations the system controller 12 can take system level decisions based on configuration data to activate one or more fog/jet monitors FJM based on parameters such as distance of the fire (e.g., K1 or K2) from the fog/jet monitors FJM1, FJM2, size of the fires, the number of unique fires and wind data.

The embodiment of the selection rules can be exemplified but not limited to the following:

(1) Selection of the operating mode of the fire (fog or jet) based on the distance of the fire (e.g., K1 or K2) from the fog/jet monitor FMJ1, FJM2. Select the fog mode if the distance is less than a configured threshold value and jet mode for values above the threshold.

(2) In case of multiple fog/jet monitors FJM (e.g., FJM1, FJM2) employed in the protected area 11, one or more fog/jet monitors FJM are selected to suppress a single fire based on the size of the fire (3) In case of multiple fog/jet monitors FJM and multiple simultaneous fires, the selection rule is implemented such that the fog/jet monitor FJM which is physically closest to the fire is selected to suppress the corresponding fire.

(4) In case of multiple fog/jet monitors FJM, selection of an appropriate fog/jet monitor FJM to address the inaccessible areas of the fog/jet monitor FJM even though the fog/jet monitor FJM is physically close to the fire.

Figure 14:
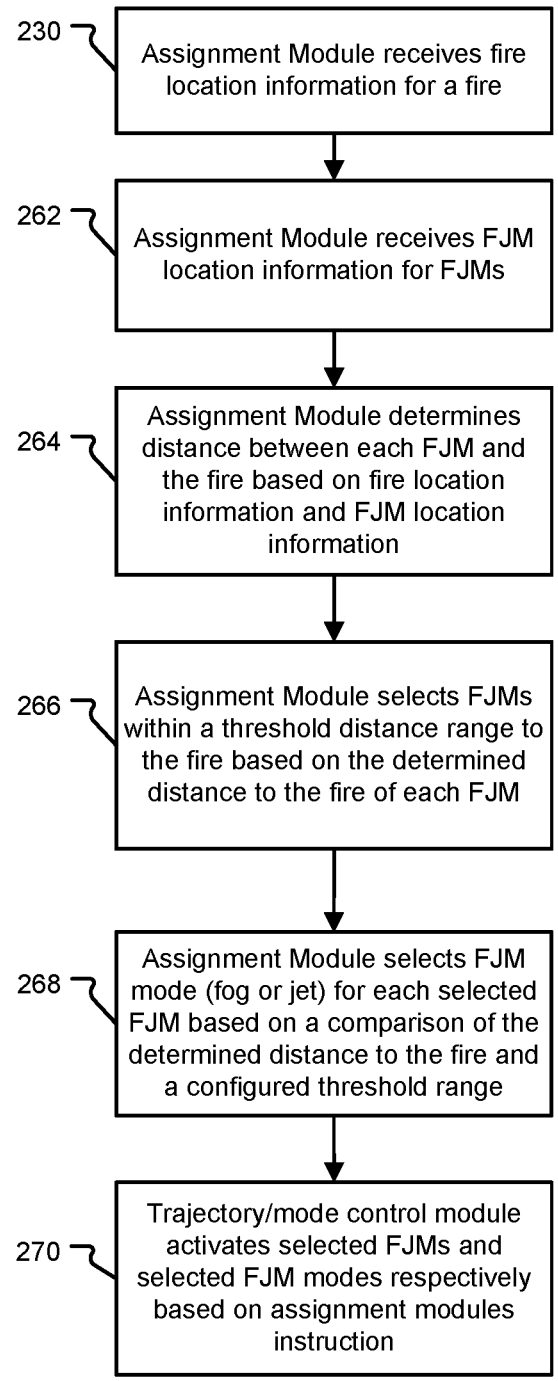
FIG. 14 is a flowchart illustrating the steps performed by the assignment module for selecting an optimal fog/jet monitor for suppressing a fire.

As an example, FIG. 14 illustrates the steps performed by the assignment module 210 for selecting an optimal fog/jet monitor FJM for suppressing a fire. Similar to optimizing process of FIGS. 13A-13C, at step 230 the assignment module 210 receives fire location information for a fire. In step 262, the assignment module 210 receives or accesses FJM location information for fog/jet monitors FJM. The assignment module 210 determines distance (e.g., K1 or K2) between each fog/jet monitor FJM1, FJM2 and the fire based on fire location information and FJM location information (step 264). In step 266, the assignment module 210 selects fog/jet monitors FJMs within a threshold distance range to the fire based on the determined distance to the fire for each fog/jet monitor FJM. The assignment module 210 selects FJM mode (fog or jet) for each selected fog/jet monitor FJM based on a comparison of the determined distance to the fire and a configured threshold range (step 268). The trajectory/mode control module 210 (shown in FIG. 5) activates selected fog/jet monitors FJM and selected FJM modes respectively based on the assignment modules instruction (step 270).

In addition to selection of the fire detectors FD1, FD2, and FD3 based on distance, FIG. 15 also illustrates how the fog/jet monitors FJM are selected based on shortest distance to the Fire. For example, as noted above, distance K1 for the first fog/jet monitor FJM1 is compared against distance K2 for the second fog/jet monitor FJM2.

An example fire detection and suppression system 10 can include fire detectors FD for detecting fire and generating location information. Also, the fire detection and suppression system 10 includes fog/jet monitors FJM for suppressing the fire. In this example, the system controller 12 generally determines a location of the fire and activates the fog/jet monitors FJM to deploy suppressant based on a distance between each of the fog/jet monitors FJM and the location of the fire.

Figure 16:
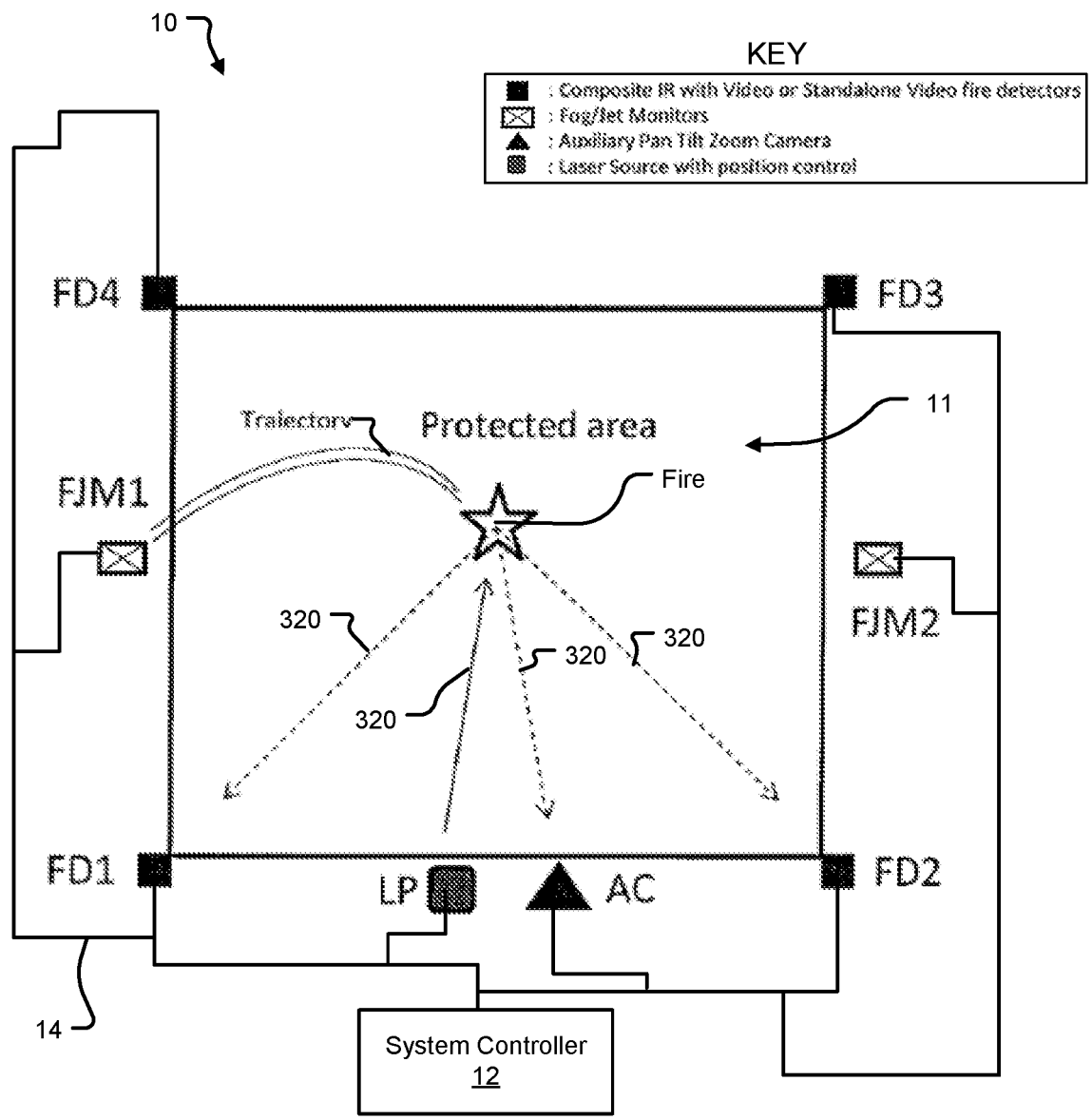
FIG. 16 is a schematic drawing of the fire detection and suppression system implementing trajectory monitoring technology to track the trajectory of the fog/jet monitor.

As shown in FIG. 16, the directionally intelligent fire detection and suppression system 10 automatically points the water/foam jet of the fog/jet monitor FJM1 towards the calculated fire position (noted by the star). However, feedback techniques to analyze if the jet of the fog/jet monitor FJM was indeed directed towards the fire source are important to both, automatically stop the jet after the fire was put out or escalate the alarm level to the first responder.

One feedback mechanism is to monitor the fire cluster information from the fire detector FD sensors and verify if the size of the fire cluster is reduced or if the fire detector FD no longer detects and reports the fire in the earlier reported positions. In this case, it means that the fog/jet monitor FJM was appropriately positioned to address the fire location.

The other techniques involve a more active monitoring of the water/foam trajectory. FIG. 16 illustrates the fire detection and suppression system 10 implementing trajectory monitoring to track the trajectory of the fog/jet monitor FJM1. This reference diagram provides a general process view of the operation of the trajectory monitoring feature using within the fire detection and suppression system 10.

In one example, the fire detection and suppression system 10 can include fog/jet monitors FJM for deploying fire suppressant onto a fire. A suppressant monitoring system (e.g., using the trajectory monitoring module 214) monitors the deployment of the fire suppressant. Also, the system controller 12 controls the fog/jet monitors FJM based on how the suppressant is deployed onto the fire. The system controller 12 can monitor the suppressant by using a video camera system (e.g., auxiliary PTZ camera AC).

There are several ways in which the video information of the region of interest and its neighborhood (expanded region of interest) can be used to monitor the trajectory of foam/water. In one embodiment, a non-inflammable and distinctly colored/fluorescent agent is added to the foam/water. The video information in the expanded region of interest is analyzed to detect the presence of the distinct color of the additive and a positive detection of the same is an indication that the trajectory is indeed directed toward the fire.

In another embodiment, a laser source with a distinct pattern is directed towards the fire location. The video information in the expanded region of interest is analyzed to detect the reflection of the whole or partial laser pattern and a positive detection of the pattern is confirmation that the trajectory is effectively directed towards fire.

One of the trajectory monitoring approaches involves the utilization of a non-combustible fluorescent/phosphorescent dye/pigment as an additive to a water/foam mixture forming fire suppressant. A fire detector FD1, FD2 such as the FV300 with CCTV/video output or the auxiliary PTZ video camera AC can be used for monitoring the trajectory of the fire suppressant as shown by the video feedback 320. The auxiliary PTZ camera AC can be driven by the system controller 12 to point towards the position of the fire (i.e., region of interest (ROI)). The video information received by the fire detectors FD1, FD2 and auxiliary PTZ camera AC by video feedback 320. The fire or this region of interest is processed by the video analytics sub-module 216 of the trajectory monitoring module 214. In particular, the video analytics sub-module 216 looks for the specific color information corresponding to the fluorescent/phosphorescent additive. A positive detection of the fluorescent color confirms that trajectory (noted as directed by the first fog/jet monitor FJM1) is effectively pointing at the fire location (Fire).

Figure 17:
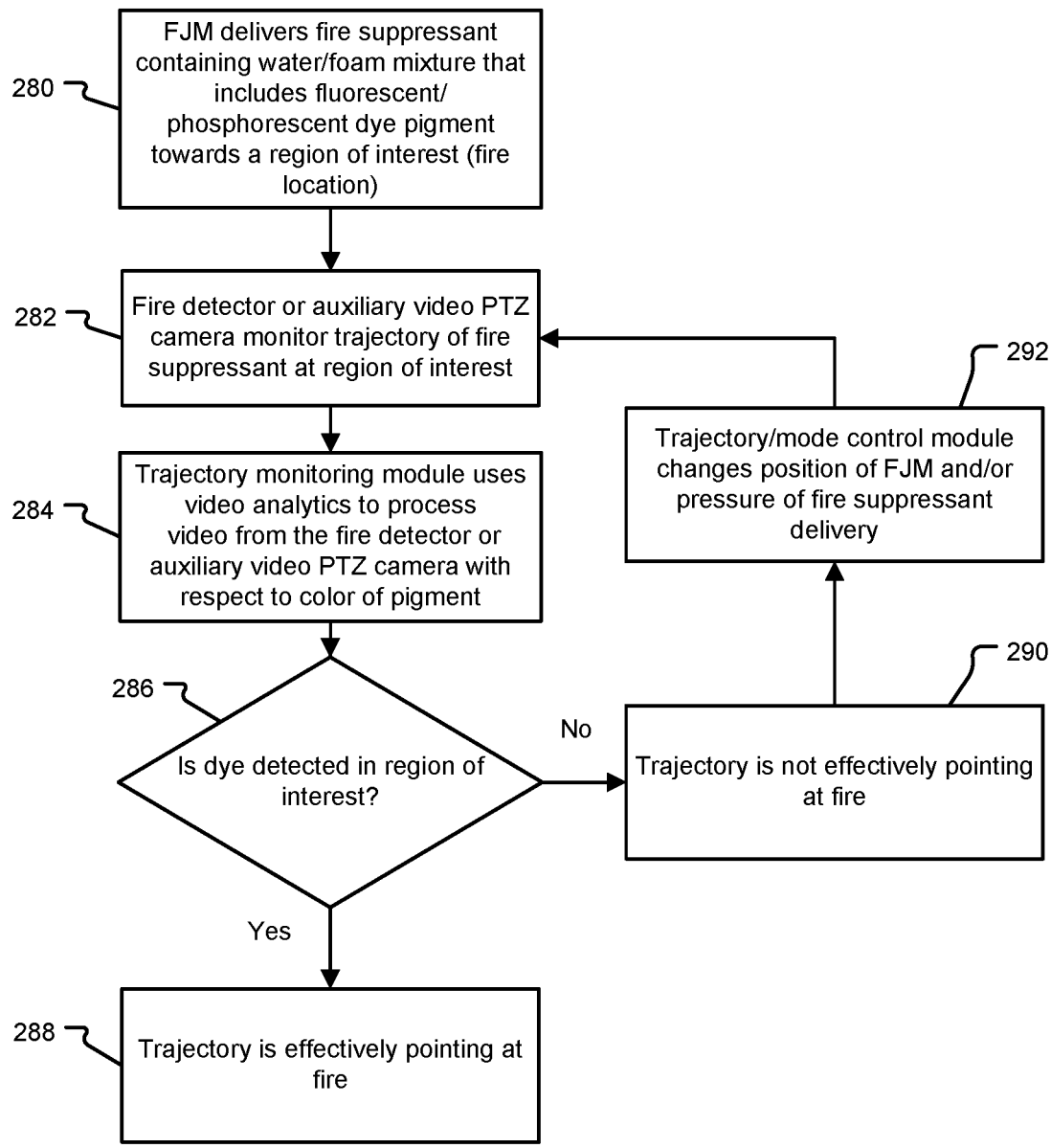
FIG. 17 is a flowchart illustrating the steps performed in tracking a fog/jet monitor trajectory using dye.

FIG. 17 illustrates the steps performed by the trajectory monitoring module 214 for performing this process of tracking the trajectory based on a pigment in the fire suppression. In step 280, the fog/jet monitor FJM delivers fire suppressant containing water/foam mixture, which includes a fluorescent/phosphorescent dye pigment, towards a region of interest (fire location). The fire detector FD1, FD2 or auxiliary video PTZ camera AC monitor the trajectory of the fire suppressant at the region of interest (i.e., Fire noted in FIG. 16) (step 282). In step 284, the trajectory monitoring module 214 uses video analytics (i.e., video analytics sub-module 216) to process video from the fire detector FD1, FD2 or auxiliary video PTZ camera AC with respect to color of pigment in suppressant. At step 286, the trajectory monitoring module 214 determines if the dye is detected in the region of interest based on the video analytics. If yes, the trajectory is deemed as effectively pointing at the fire (step 288). Otherwise, if no, the trajectory is deemed as not effectively pointing at the fire (step 290). Thus, at step 292, trajectory/mode control module 212 changes the position of the fog/jet monitor FJM nozzle 206 and/or changes pressure of fire suppressant delivery. This instruction occurs via the FJM controller 202 to direct the oscillation mechanism 204 to move in a specific direction or adjust the suppressant supply 208 to provide a change in pressure of suppressant liquid.

Figure 18:
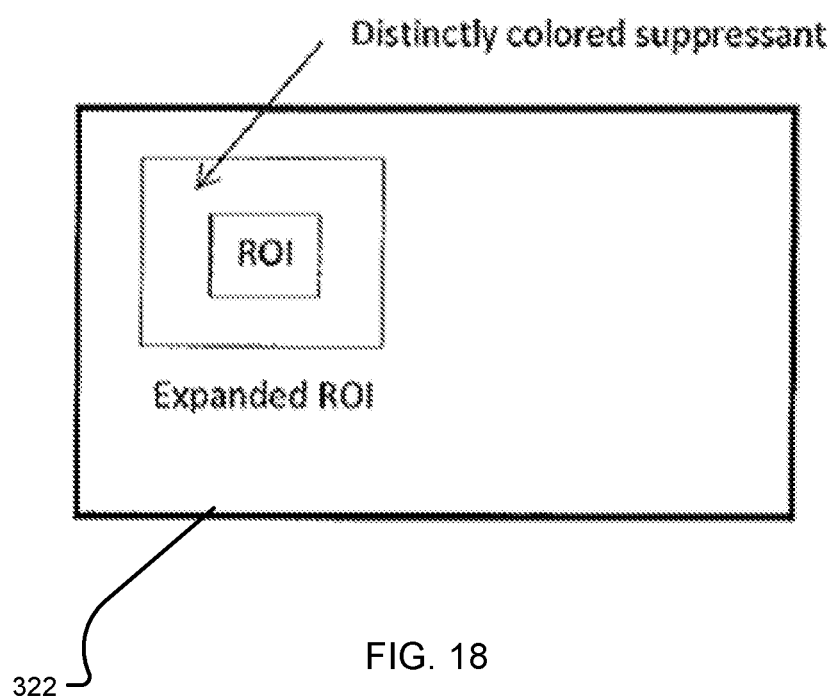
FIG. 18 is a camera display of the video analysis used in tracking the trajectory of the fog/jet monitor using dye.

FIG. 18 is camera display 322 of the video analysis of the dye after completion of the steps in FIG. 17. In particular, as shown in the camera display 322, a distinctly colored suppressant is detected in the expanded region of interest surrounding the region of interest for the fire.

As shown in FIG. 16, an alternative embodiment, a suitably powered non-hazardous laser source LP (i.e., laser source with position control), which can create a distinct and unique pattern 320 is directed towards the source of the fire (noted by the star) after the activation of the fog/jet monitor FJM1. The video analytics sub-module 216 of the trajectory monitoring module 214 processes video in the region of interest ROI to look for the laser pattern 320 or signature. A positive detection of a completely or partially reflected laser pattern 320 is an indication that the suppressant is indeed directed towards the real location of fire (i.e., region of interest ROI).

Figure 19:
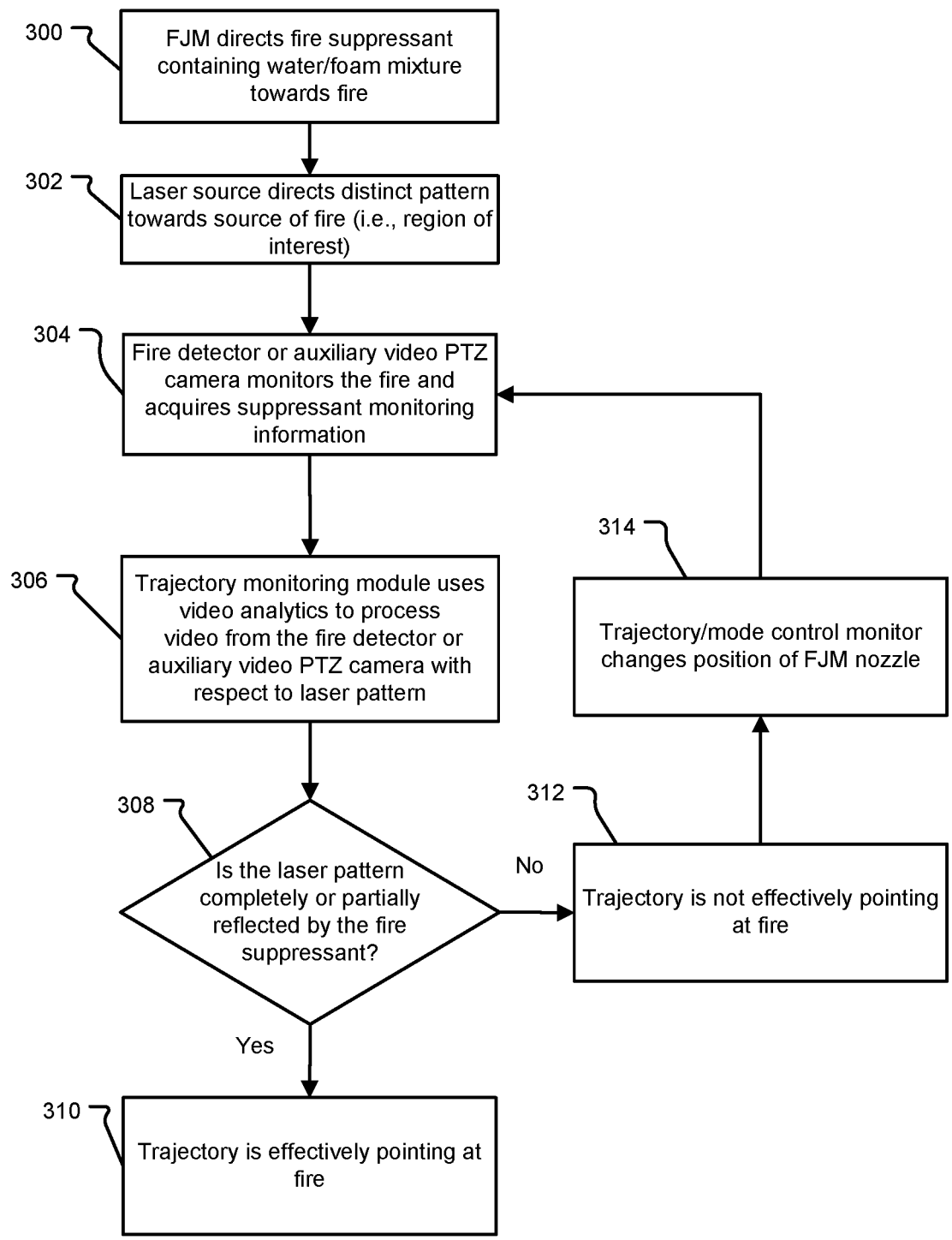
FIG. 19 is a flowchart illustrating the steps performed in tracking a fog/jet monitor trajectory using a laser pattern.

FIG. 19 illustrates the steps performed by the trajectory monitoring module 214 for performing this process of tracking the trajectory of the fog/jet monitor FJM1 based on a laser pattern 320. In step 300, the fog/jet monitor FJM1 directs fire suppressant containing water/foam mixture towards fire. A laser source LP directs a distinct pattern 320 towards the source of fire (i.e., region of interest noted by star) (step 302). In step 304, the fire detector FD1, FD2 or auxiliary video PTZ camera AC monitors the fire and acquires suppressant monitoring information. The trajectory monitoring module 214 uses the video analytics sub-module 216 to process the video from the fire detector FD1, FD2 or auxiliary video PTZ camera AC with respect to a laser pattern 320 (step 306).

In step 308, the trajectory monitoring module 214 determines whether the laser patter 320 is completely or partially reflected by the fire suppressant. If yes, the trajectory is deemed as effectively pointing at fire (step 310).

If there is insufficient reflection, the trajectory is deemed as not effectively pointing at fire (step 312). As a result, the trajectory/mode control module 212 changes the position of the fog/jet monitor FJM nozzle 206 and/or changes pressure of fire suppressant delivery. This instruction occurs via the FJM controller 202 to direct the position and oscillation mechanism 204 to move in a specific direction or adjust the suppressant supply 208 to provide a change in pressure of suppressant liquid.

Figure 20:
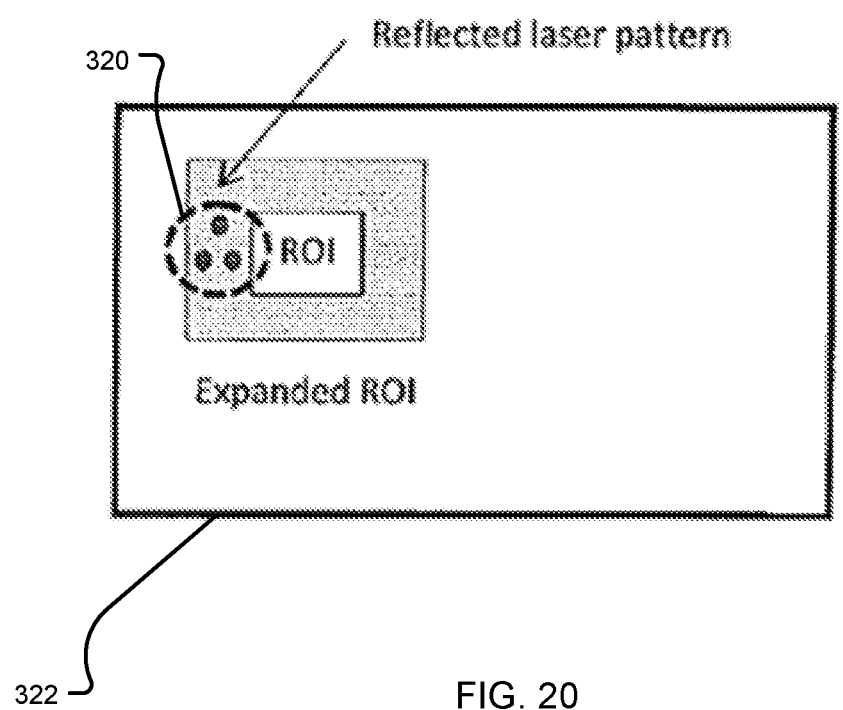
FIG. 20 is a camera display of the video analysis used in tracking the trajectory of the fog/jet monitor using the laser pattern.

FIG. 20 is a camera display 322 of the video analysis of the laser pattern after completion of the steps in FIG. 19. In particular, as shown in the camera display 322, the laser pattern 320 is reflected in the expanded region of interest surrounding the region of interest for the fire. This means that the laser pattern 320 is reflected by the suppressant in this expanded region of interest ROI surrounding the fire.

In general, the system controller 12 is configured to activate either fog mode and/or jet mode for the fog/jet monitors FJM based on how the suppressant is deployed onto the fire.

In an alternative embodiment the video analytics sub-module 216 used can also implement the detection of human movement and presence in the vicinity of the fire. The fog/jet monitor FJM output is activated after a positive indication that no human presence is detected in the region of interest ROI so that there is no risk to human life.

The remote services module 220, as shown in FIG. 5, can stream the CCTV video output from the fire detectors FD or video teed from the auxiliary PTZ camera AC to a PC in a remote monitoring center 200 or smartphone/tablet of supervisory personnel as shown in FIG. 1. Optionally a user interface can be provided in the remote monitoring center 200 to be able to control the pan, tilt and zoom of the auxiliary camera AC. The user interface can also include the following facilities:

a) Control inputs to toggle the operating modes of the system between automatic and manual modes
b) Control inputs to control the horizontal and vertical nozzle positions of one or more fog/jet monitors using the oscillation mechanism 204.

The remote services module 220 also aggregates the system health which can include any sub-system component such as health and diagnostics information.

One or more of the following actions can be initiated when the trajectory monitoring module 214 detects that the suppressant is not effectively directed towards the fire location or when it is determined that the fire detectors ED continue to detect fire(s) even after the expiry of a configured time-out from the start of suppression steps.

a) Escalate the severity of the fire alarm to alert the safety personnel of a severe hazardous condition which requires a much more urgent manual intervention.
b) Provide an explicit indication on the user interface of the remote monitoring center 200 that a manual mode is enabled for remote operators to control the position of one or more fog/jet monitors FJM.

The configuration module 218, as shown in FIG. 5, of the system controller 12 can be configured with information about the physical and relative positions of the fire detectors FD and fog/jet monitor FJM. These physical distances are used as parameters in order to triangulate the 3D fire location as well as compute the angular position to direct the fog/jet monitor FJM nozzle 206 towards the fire. The physical placements of the fire detectors FD and fog/jet monitor FJM can be graphically captured on a PC application which communicates with the system controller 12 and configures the required parameters.

Optionally wireless positioning technologies based on wireless sensor networks/WiFi can be used for auto-configuration. In such cases, addressable wireless communication nodes are installed at each of the fire detectors HD, fog/jet monitors FJMs, and other suitable locations. The received signal strength from wireless communication nodes is analyzed and the location of the fire detectors FD and fog/jet monitor FJM is estimated in the configuration module 220 using the parameters derived for the system operation.

There could be certain regions (masked regions) in the protected area 11 which should be inaccessible to the jet from the fog/jet monitor FJM. Such areas can be graphically captured in the PC application described above and the system controller 12 can be configured via the configuration module 218 to prevent directing the jet towards the masked region.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fire detection and suppression system, comprising:
a plurality of fire detectors for detecting a fire and generating location information, each of the fire detectors comprising a two-dimensional infrared sensor array;
a plurality of fog/jet monitors for suppressing the fire, the fog/jet monitors having a fog mode and a jet mode; and
a system controller that determines a location of the fire and activates the monitors to deploy suppressant based on a distance between each of the monitors and the location of the fire, the system controller further selectively activating the fog mode and the jet mode based on the distance between each of the monitors and the location of the fire.

2. A fire detection and suppression method, comprising:
detecting a fire and generating location information with a plurality of fire detectors, each of the fire detectors comprising a two-dimensional infrared sensor array;
a system controller determining a location of the fire based on the fire detectors and activating monitors to deploy suppressant based on a distance between each of the monitors and the location of the fire; and
the system controller selectively activating a fog mode and a jet mode of the monitors based on the distance between each of the monitors and the location of the fire.

3. The method as claimed in claim 2, further comprising determining an initial location of the fire based on the fire location information from the fire detectors, then determining a final location of the fire based on the fire location information taking into account spatial and/or angular relationships between the fire detectors and the initial location.

4. The method as claimed in claim 2, further comprising selecting a few of the fire detectors that are closest to an initial location of the fire, and then determining a final location based on the few fire detectors.

5. The method as claimed in claim 2, wherein the few fire detectors is a pair of fire detectors.

6. The method as claimed in claim 2, further comprising selecting a few fire detectors based on a sum of the distances between the few fire detectors and the location of the fire.

7. The method as claimed in claim 2, further comprising determining a final location based on weighted average of the location information from the fire detectors, the weighted average being based on distance between the fire detectors and an initial location of the fire.

8. The method as claimed in claim 4, further comprising determining the final location based on an angular direction of the fire relative to the fire detectors.

9. The fire detection and suppression system as claimed in claim 1, wherein the system controller determines an initial location of the fire based on the fire location information from the fire detectors, then determines a final location of the fire based on the fire location information taking into account spatial and/or angular relationships between the fire detectors and the initial location.

10. The fire detection and suppression system as claimed in claim 9, wherein the system controller selects a few of the fire detectors that are closest to the initial location of the fire, and determines the final location based on the few fire detectors.

11. The fire detection and suppression system as claimed in claim 10, wherein the few fire detectors is a pair of fire detectors.

12. The fire detection and suppression system as claimed in claim 9, wherein the system controller selects a few fire detectors based on a sum of the distances between the few fire detectors and the initial location of the fire.

13. The fire detection and suppression system as claimed in claim 9, wherein the system controller determines the final location based on weighted average of the location information from the fire detectors, the weighted average being based on distance between the fire detectors and the initial location of the fire.

14. The fire detection and suppression system as claimed in claim 9, wherein the system controller determines the final location based on an angular direction of the fire relative to the fire detectors.

\* \* \* \* \*